United States Patent
Ryan et al.

(10) Patent No.: US 6,230,263 B1
(45) Date of Patent: May 8, 2001

(54) DATA PROCESSING SYSTEM PROCESSOR DELAY INSTRUCTION

(76) Inventors: Charles P. Ryan, 47017 N. Meander, Phoenix, AZ (US) 85027; Ronald W. Yoder, 2302 W. Emellita Ave., Mesa, AZ (US) 85202; William A. Shelly, 4900 E. Osborn Rd., Phoenix, AZ (US) 85018

( * ) Notice: Subject to any disclaimer, the term of this patent is extended or adjusted under 35 U.S.C. 154(b) by 0 days.

(21) Appl. No.: 09/156,376

(22) Filed: Sep. 17, 1998

(51) Int. Cl.[7] .................................................. G06F 9/30
(52) U.S. Cl. ............................................ 712/245; 712/227
(58) Field of Search ..................................... 712/241, 245, 712/227

(56) References Cited

U.S. PATENT DOCUMENTS 5,958,044 * 9/1999 Brown et al. ......................... 712/219

OTHER PUBLICATIONS

Texas Instruments (TI), *TMS320C3x User's Guide*, Jul. 1992, pp. 5–3 to 5–17, 6–2 to 6–6, 6–10 to 6–15, 10–136, and 10–161 to 10–162.*

Zaks, Rodnay, *Programming the 6502*, third edition, Sybex, 1980, p. 160.*

Uffenbeck, John, *Microcomputers and Microprocessors, THe 8080, 8085, and Z–80 Programming, Interfacing, and Troubleshooting*, Prentice–Hall, 1985, p. 114.*

Linux Kernel version 2.0.34 source code, file arch/mips/kernel/r4xx0.S, 1995.*

* cited by examiner

*Primary Examiner*—Richard L. Ellis
(74) *Attorney, Agent, or Firm*—B. E. Hayden; J. S. Solakian

(57) ABSTRACT

A processor (92) in a data processing system (80) provides a DELAY instruction. Executing the DELAY instruction causes the processor (92) to a specified integral number of clock (98) cycles before continuing. Delays are guaranteed to have a linear relationship with a constant slope with the specified number of clock cycles. Incrementing the specified delay through a range allows exhaustive testing of interactions among multiple processors.

24 Claims, 14 Drawing Sheets

DATA PROCESSING SYSTEM PROCESSOR DELAY INSTRUCTION

FIELD OF THE INVENTION

The present invention generally relates to multiprocessing computer systems, and more specifically to exhaustively testing interactions among multiple tightly coupled processors.

BACKGROUND OF THE INVENTION

The literature is full of examples where processor and system faults or "bugs" were discovered long after the processors or systems were shipped to customers. It is well known that the later in the product cycle that a "bug" is discovered, the greater the expense to fix it. Compounding this problem is the trend towards shorter and shorter product cycles. Finally, the problem is compounded again by the trend towards tightly-coupled multiple processor computer systems. This compounding is because in such a tightly-coupled multiple processor system, it is not only necessary to discover and fix the faults in a single processor, it is also now necessary to discover and fix faults resulting from the interaction among the multiple processors.

One problem with implementing tightly coupled multiple processor computer systems are in exhaustively testing the interactions between and among multiple processors. For example, in a tightly coupled system, two or more processors may each have an individual high-speed level one (L1) cache, and share a slightly lower speed level two (L2) cache. This L2 cache is traditionally backed by an even larger main memory. The L1 and L2 caches are typically comprised of high speed Static Random Access Memory (SRAM), and the main memory is typically comprised of slower speed Dynamic Random Access Memory (DRAM).

It is necessary that the cache and memory be maintained for coherency. Thus, for example, at most only a single L1 cache of a single processor is allowed to contain a cache line corresponding to a given block of main memory. When multiple processors are reading and writing the same block in memory, a conflict arises among their cache controllers. This is conflict is typically resolved in a tightly coupled multiprocessor system with an interprocessor cache protocol communicated over an interprocessor bus. For example, a first processor may be required to reserve a cache copy of the contested block of memory. This is communicated to the other processors. However, if another (second) processor already has reserved the contested block of memory, the first processor must wait until the block is unlocked, and potentially written at least back to the L2 cache.

Debugging a cache protocol can be quite difficult. This stems from a number of interrelated factors. First, the multiple processors are each typically operating asynchronously from each other at extremely high frequencies or rates of speed. Secondly, the L1 caches, and their cache controllers are typically operating at essentially the same speed as the processors. Third, instruction cache misses for test instruction sequences can delay instruction execution by relatively long, somewhat variable, periods of time. There are a number of reasons for this later problem. One reason is it may be possible to retrieve a cache line of instructions from L1 cache or from L2 cache, or it may be necessary to load the cache line from slower main memory. The DRAM comprising the main memory typically operates quite a bit slower than the processor (and L1 cache). Another problem is that the time it takes to fetch a block of instructions from the main memory may vary slightly. There are a number of causes of this. First, accessing different addresses in the DRAM may take slightly different times. This is partly because of differing signal path lengths. Secondly, different memory banks may have slightly different timing. This is true, even when the specifications for the memories are equivalent. This is particularly true, when the memories are self-timed. This problem may be accentuated when multiple processors or multiple memories share a common memory access bus, where the actions of one processor or memory may lock out, and stall, another processor or memory. Note also that asynchronous Input/Output (I/O) operations to memory can have seemingly random effects on timing.

Despite the problems described above, in order to effectively test the interaction among multiple processors, it is preferable to exhaustively test each set of possible combinations. In the case of a cache protocol as described above, it is preferable to exhaustively test each possible set of cache states and cache state transitions. It is also preferable to be able to detect and record state changes at a lower level than that available to a user program.

In order to test the interactions among multiple processors, the various combinations of states and state transitions should be tested. This can be done by executing programs simultaneously on each of the processors. Varying the time when each processor executes its program can test the different combinations. Unfortunately, there is no mechanism in the prior art to accurately exhaustively vary the times when each processor executes its program. This is partly due to the processor instruction timing variations described above. The result is that timing windows often arise where particular state and state transition interactions are not tested.

One solution to this problem is to increase the number of tests run and the number of test cycles run. This increases the chances of uncovering faults, but does not guarantee exhaustive fault coverage.

Another set of prior art solutions is to try to control more closely the timing between executions of programs by the multiple processors. One such solution is to use NOP instructions to delay execution. The larger the number of NOP instructions executed, the longer the delay. However, NOP instructions are typically executed out of blocks of instructions held in cache lines. Each time execution crosses a cache line boundary, there is a potential for a cache miss, resulting in retrieving the cache line from slower memory. There is also a potential at that point that execution may be delayed for one or more cycles due to memory bus contention. Each of these potential delays introduces a potential window that did not get tested utilizing this set of solutions. Note also that virtual memory program activity must also be accounted for.

Another problem that arises is that it is often hard to distinguish states and state transitions from a programmer's view of a processor. This is partly because there is much that is not visible at this level. States and state transitions must therefore be assumed from visible programmer model level changes in the processor. This problem of distinguishing state and state transitions is a particular problem when the states and state transitions are cache states and state transitions during interaction testing among multiple processors.

One prior art solution to determining machine states and state transitions is through the use of SCAN. Using SCAN, a known pattern of states can be loaded into a processor. The processor then executes one or two instructions. The states of the various memory elements in the processor are then unloaded from the processor and compared with their expected values. This type of functional testing is becoming common for high-end microprocessors. Unfortunately, it does not lend itself to exhaustively testing the interactions among multiple processors. One reason for this is that a processor under the control of SCAN typically only executes for one or two instruction cycles, before the SCAN latches are unloaded, and another set of values loaded. The result of this is that SCAN is extremely slow, especially in comparison to the speed of modern processors. This significantly reduces the amount of testing that can be realistically done with SCAN. Secondly, there is no readily apparent mechanism available to test multiple processors at the same time, and more importantly to vary the start times of each of the multiple processors being tested together.

In the past, it has been sometimes been possible to run enough signals out of a processor that the states and state transitions being tested can be monitored by test equipment. One problem with this method of testing is that it is a manual and error prone process. Just as important, this method is fast becoming less and less possible as more and more functionality is embedded on single chips. Pin-count has become a major concern, and it has become increasingly unlikely that precious external pins can be dedicated for the sort of interprocessor state testing described above.

Testability, and thus reliability through earlier fault detection would be significantly increased in tightly coupled multiprocessor systems if the interactions among multiple processors could be accurately exhaustively tested, with the guarantee that no timing windows were inadvertently left untested. This testability would be further enhanced by a mechanism for recording states and state transitions over a series of clock cycles for each of the processors being tested.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which.

DETAILED DESCRIPTION

In the following description, numerous specific details are set forth such as specific word or byte lengths, etc. to provide a thorough understanding of the present invention. However, it will be obvious to those skilled in the art that the present invention may be practiced without such specific details. In other instances, circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

The term "bus" will be used to refer to a plurality of signals or conductors which may be used to transfer one or more various types of information, such as data, addresses, control, or status. The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one.

Figure 1:
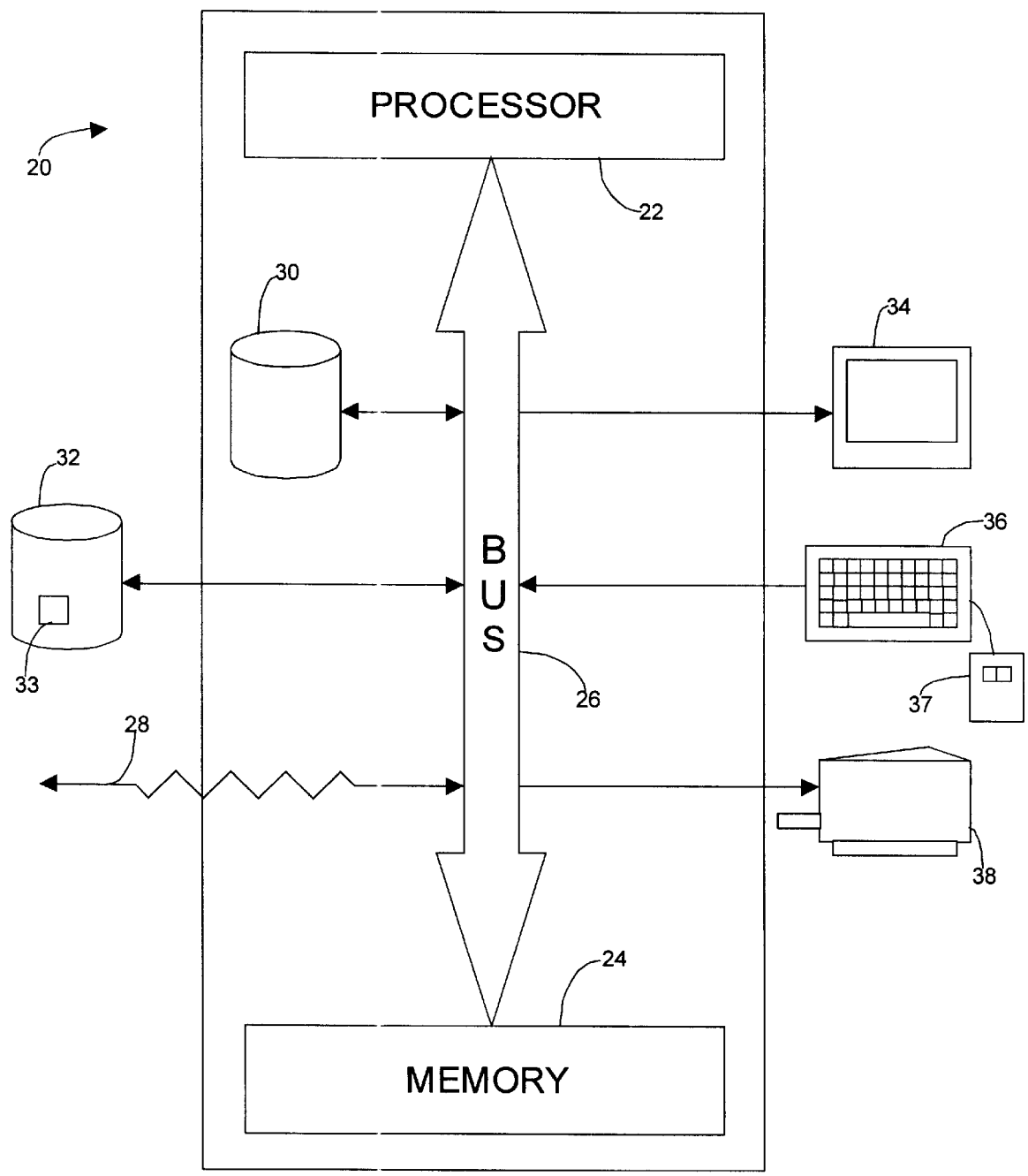
FIG. 1 is a block diagram illustrating a General Purpose Computer, in accordance with the present invention.

FIG. 1 is a block diagram illustrating a General Purpose Computer 20. The General Purpose Computer 20 has a Computer Processor 22, and Memory 24, connected by a Bus 26. Memory 24 is a relatively high speed machine readable medium and includes Volatile Memories such as DRAM, and SRAM, and Non-Volatile Memories such as, ROM, FLASH, EPROM, EEPROM, and bubble memory. Also connected to the Bus are Secondary Storage 30, External Storage 32, output devices such as a monitor 34, input devices such as a keyboard (with mouse) 36, and printers 38. Secondary Storage 30 includes machine-readable media such as hard disk drives, magnetic drum, and bubble memory. External Storage 32 includes machine-readable media such as floppy disks, removable hard drives, magnetic tape, CD-ROM, and even other computers, possibly connected via a communications line 28. The distinction drawn here between Secondary Storage 30 and External Storage 32 is primarily for convenience in describing the invention. As such, it should be appreciated that there is substantial functional overlap between these elements. Computer software such test programs, operating systems, and user programs can be stored in a Computer Software Storage Medium, such as memory 24, Secondary Storage 30, and External Storage 32. Executable versions of computer software 33, can be read from a Non-Volatile Storage Medium such as External Storage 32, Secondary Storage 30, and Non-Volatile Memory and loaded for execution directly into Volatile Memory, executed directly out of Non-Volatile Memory, or stored on the Secondary Storage 30 prior to loading into Volatile Memory for execution.

Figure 2:
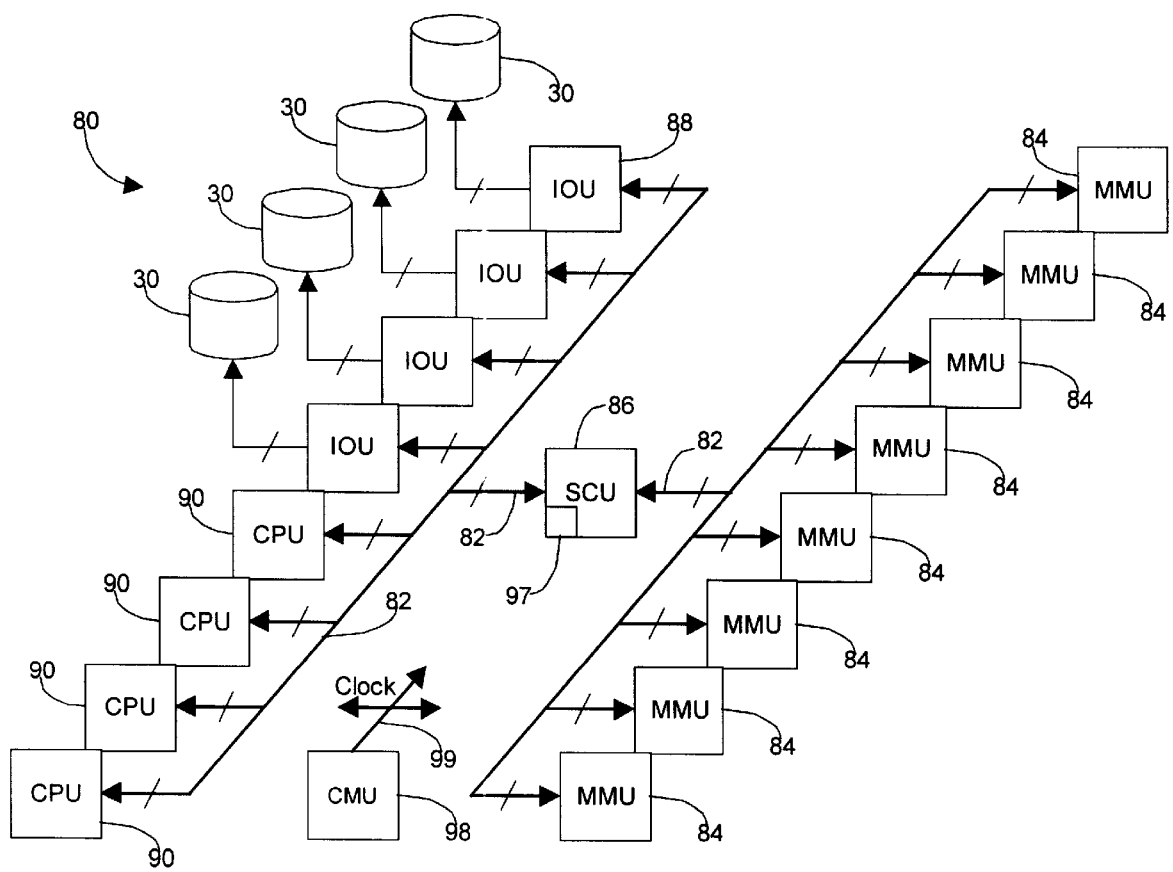
FIG. 2 is a block diagram of a more detailed view of a multiprocessor data processing system, in accordance with the present invention.

FIG. 2 is a block diagram of a more detailed view of a multiprocessor data processing system, in accordance with the present invention. The multiprocessor data processing system 80 comprises a plurality of modules coupled together via an intramodule bus 82 controlled by a storage control unit 86. In the preferred embodiment, each such module 84, 88, 90 is contained on a single board, with the boards connecting into a backplane. The backplane includes the intramodule bus 82. In the representative data processing system 80 shown in FIG. 2, sixteen modules are shown. The system includes four (4) processor ("CPU") modules 90, four (4) Input/Output ("IOU") modules 88, and eight (8) memory ("MMU") modules 84. Each of the four Input/Output ("IOU") modules 88 is shown coupled to secondary storage 30. This is representative of the function of such IOU modules 88. Each IOU module 88 will typically contain a plurality of IOU processors (not shown). Each of the eight memory modules 84 contains memory 24 and a memory controller (not shown). This memory 24 is typically Dynamic Random Access Memory (DRAM). Large quantities of such memory 24 are typically supported. Also shown in FIG. 2 is a Clock Management Unit 98, which supplies a standard clock signal 99 to the remainder of the system 80. As clock signals are ubiquitous in digital computer architectures, the clock signal 99 will not be shown further herein except where relevant. Note also that in the preferred embodiment, multiple Clock Management Units 98 are utilized to provide a redundant clock signal 99.

Figure 3:
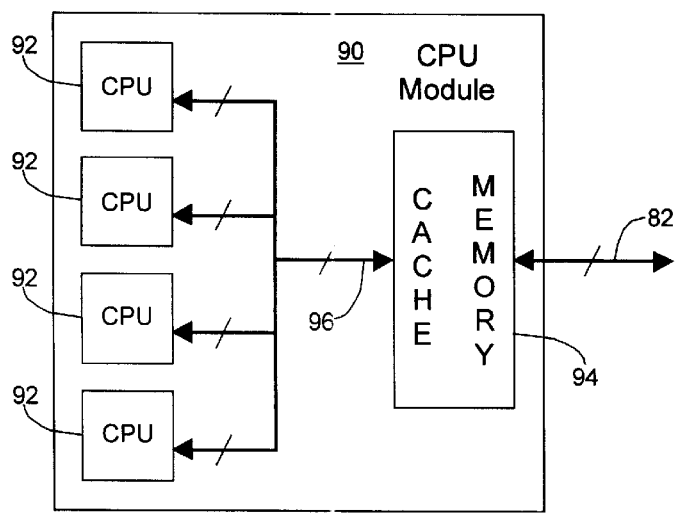
FIG. 3 is a block diagram illustrating a processor (CPU) module as shown in FIG. 2.

FIG. 3 is a block diagram illustrating a processor (CPU) module 90 as shown in FIG. 2. The CPU module 90 contains a plurality of processors (CPU) 92 and a cache memory system 94. In the preferred embodiment, each processor (CPU) module 90 contains up to four (4) processors (CPU) 92. The processors 92 and the cache memory system 94 are coupled together and communicate over an intraprocessor bus 96.

The cache memory system 94 is shared among the processors 92 on the CPU module 90 and maintains cache copies of data loaded into those processors 92. The cache memory system 94 is considered here a Level 2 cache and is coupled to and communicates with the storage control system (SCU) 88 over the intramodule bus 82 in order to maintain cache coherency between Level 1 cache memories 94 on each of the processor modules 90, as well as between cache memories 54, 56 in each of the processors 92, and on the IOU modules 88. The SCU 88 also maintains coherency between the various cache memories 94, 54, 56, and the typically slower speed memory in the MMU modules 84. In the preferred embodiment, a single block of memory will be owned by a single cache or memory at potentially each level in the memory hierarchy. Thus, a given memory block may be owned by one Level 1 cache 54, 56, by one Level 2 cache 94, and by one MMU 84.

Figure 4:
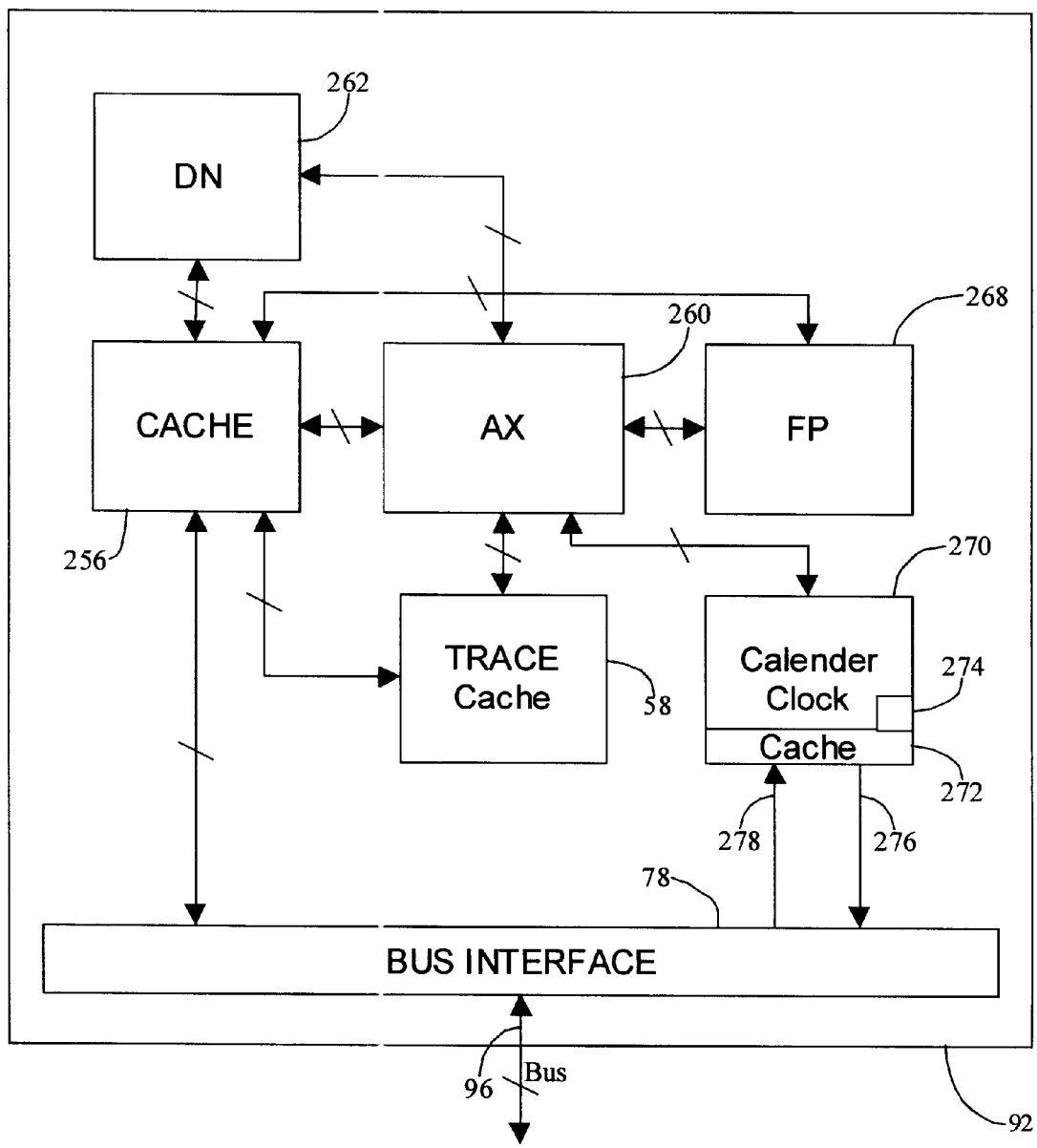
FIG. 4 is a block diagram of a processor shown in FIG. 3.

FIG. 4 is a block diagram of a processor 92 shown in FIG. 3. The processor 92 communicates with the bus 96 utilizing a bus interface 78. The bus interface is bidirectionally coupled to a unified local cache 256. Cache memories, such as this unified local cache 256, are typically constructed as high speed Static Random Access Memories (SRAM). In the preferred embodiment, the local cache 256 is incorporated on the same integrated circuit as the remainder of the processor 92. The local cache 256 is the primary block that interfaces with the bus interface 78. Data and instructions are loaded via the bus 96 into the local cache 256, and data is written back from the local cache 256 via the bus 96.

The local cache 256 is bidirectionally coupled to an AX module 260. The AX unit 260 provides the bulk of the functionality of the processor 92, including instruction decode. The AX unit 260 is bidirectionally coupled to and controls execution of a floating point (FP) unit 268 and a decimal/numeric (DN) unit 262. In the preferred embodiment, the floating point unit 268 performs both floating point operations, and fixed point multiplications and divisions. It is bidirectionally coupled to the local cache 256. The decimal/numeric (DN) unit 262 performs decimal and string operations. It is bidirectionally coupled to the local cache 256, allowing it to operate relatively autonomously from the AX unit 260. Rather, once decimal or string operations are initiated in the DN unit 262, the DN unit 262 is driven by operand availability in the local cache 256.

Bidirectionally coupled to both the AX unit 260 and the local cache 256 is a Trace RAM cache 58 which is capable of caching the status of instruction or cache operation. The Trace RAM 58 is controlled by commands decoded and executed by the AX unit 260. The Trace RAM 58 also selectively traces AX unit 260 statuses. The Trace RAM 58 receives and selectively traces cache state signals from the local cache 256. When a trace is complete, the Trace RAM 58 can be written out to the local cache 256, and ultimately to slower memories.

Bidirectionally coupled to both the bus interface 78 and the AX unit 260 is a local calendar clock unit 270. The local calendar clock unit 270 contains a Cached Calendar Clock 272 and a Calendar Clock Valid flag 274. The calendar clock unit 270 also contains arithmetic and logical circuitry allowing the Cached Calendar Clock 272 to be updated utilizing the same clock signals 99 as the master calendar clock 97. In the preferred embodiment, the Master Calendar Clock 97 and the Cached Calendar Clock 272 are incremented every microsecond utilizing the common clock signal. Thus, the Cached Calendar Clock 272 will maintain the same calendar clock time as the Master Calendar Clock 97, after being loaded with the same calendar clock value.

The Calendar clock unit 270 provides a Transmit Calendar Clock Updated signal 276 to the bus interface 78 whenever the Master Calendar Clock 97 is loaded or updated under program control with a new calendar clock value. This signal is transmitted via the bus 96 to all of the other processors 92 in the data processing system 80, which each in turn receive the signal from the bus 96 as a Receive Calendar Clock Updated signal 278. The Receive Calendar Clock Updated signal 278 that is received by the local Calendar Clock Unit 270 results in the clearing of the Calendar Clock Valid flag 274, forcing that processor 92 to request the calendar clock value from the Master Calendar Clock 97 the next time the Calendar Clock is read by that processor 92 under program control. It should be noted that the local calendar clock unit 270 is shown as a separate functional unit in FIG. 4. This is done for illustrative purposes. In the preferred embodiment, the local calendar clock unit 270 forms a portion of the AX module 260, with parts of its functionality described herein being incorporated in various AX submodules (see FIG. 5).

Figure 5:
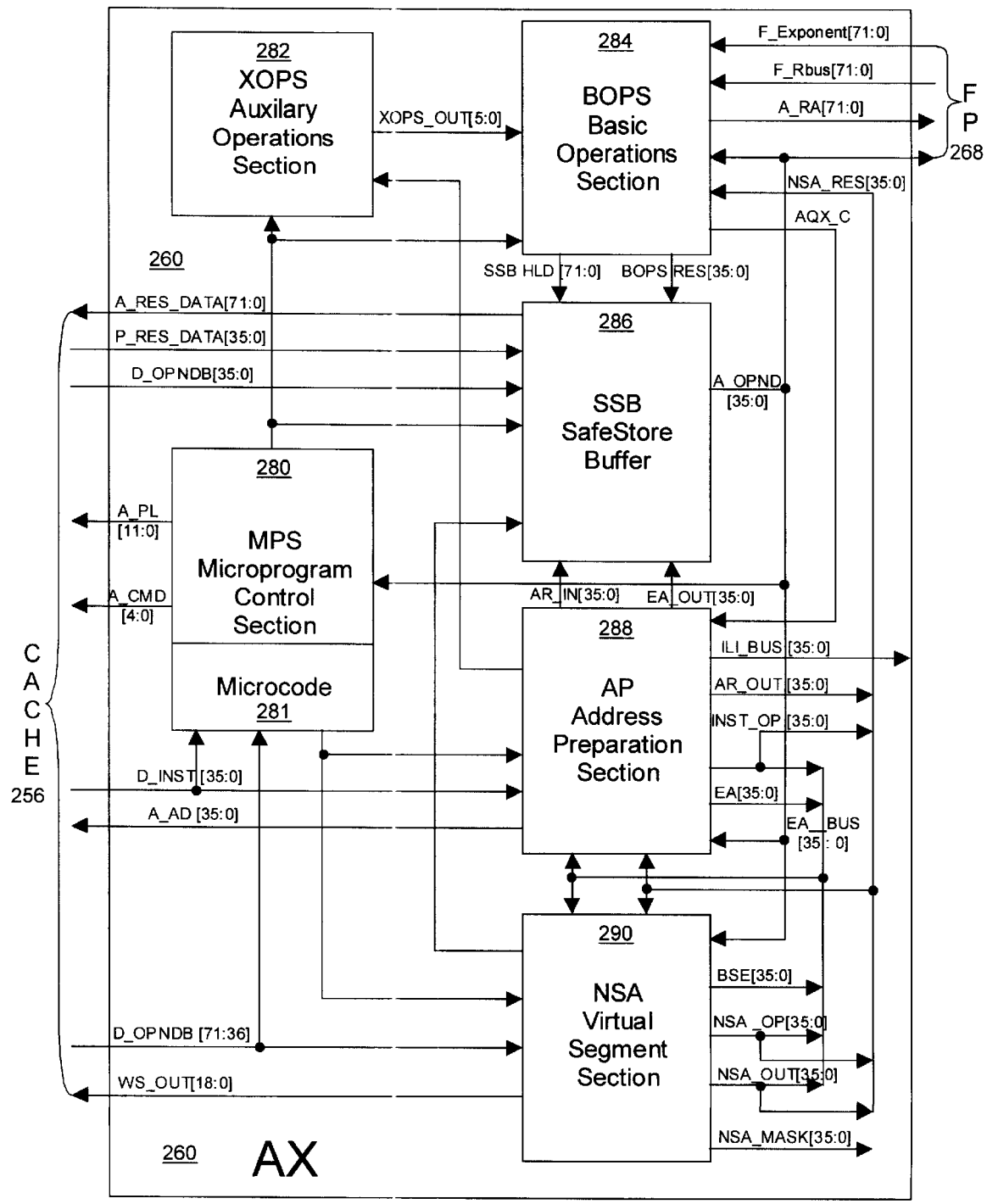
FIG. 5 is a block diagram of an AX unit in the processor shown in FIG. 4.

FIG. 5 is a block diagram of an AX unit 260 in the processor 92 shown in FIG. 4. The AX unit 260 comprises a Microprogram Control Section (MPS) unit 280, an Auxiliary Operations Section (XOPS) 282, a Basic Operations Section (BOPS) 284, a Safe Store Buffer (SSB) 286, an Address Preparation (AP) section 288, and a NSA Virtual Segment Section 290. The MPS 280 is bidirectionally coupled to and receives instructions from the local cache 256. The MPS 280 performs instruction decode and provides microprogram control of the processor 92. The microprogram control utilizes a microengine executing microcode 281 stored in both dynamic and static memories in response to the execution of program instructions. The MPS 280 is bidirectionally coupled to and controls operation of the Auxiliary Operations Section (XOPS) 282, the Basic Operations Section (BOPS) 284, the floating point (FP) unit 268, the decimal/numeric (DN) unit 262, the Address Preparation (AP) section 288, and the NSA Virtual Segment Section 290. The Basic Operations Section (BOPS) 284 is used to perform fixed point arithmetic, logical, and shift operations. The Auxiliary Operations Section (XOPS) 282 performs most other operations. The Address Preparation (AP) section 288 forms effective memory addresses utilizing virtual memory address translations. The NSA Virtual Segment Section 290 is bidirectionally coupled to and operates in conjunction with the AP section 288, in order to detect addressing violations.

The Safe Store Buffer (SSB) 286 stores the current status of the processor 92 environment, including user and segment registers, for the purpose of changing processor state. The SSB 286 is coupled to and receives signals from the BOPS 284, the AP section 288, the MPS 280, and the NSA 290. The SSB 286 is bidirectionally coupled to the local cache 256, allowing SSB 286 frames to be pushed out to cache 256 when entering a new processor environment, and pulled back from cache 256 when retuning to an old processor environment.

In the preferred embodiment, the Wait for Sync (WSYNC), Transmit Sync (TSYNC), Delay (DELAY), and trace (TRACE) instructions are decoded and executed under microprogram control by the MPS 280 unit in the AX unit 260. The Wait for Sync (WSYNC) and Transmit Sync (TSYNC) instructions utilize the transmit Calendar Clock Updated signal 276 and receive Calendar Clock Updated signal 278 otherwise utilized by the local calendar clock unit 270. Operation of the TSYNC instruction is shown in more detail in FIG. 10. Operation of the WSYNC instruction is shown in more detail in FIG. 11. Operation of the DELAY instructions shown in more detail in FIG. 12.

Figure 6:
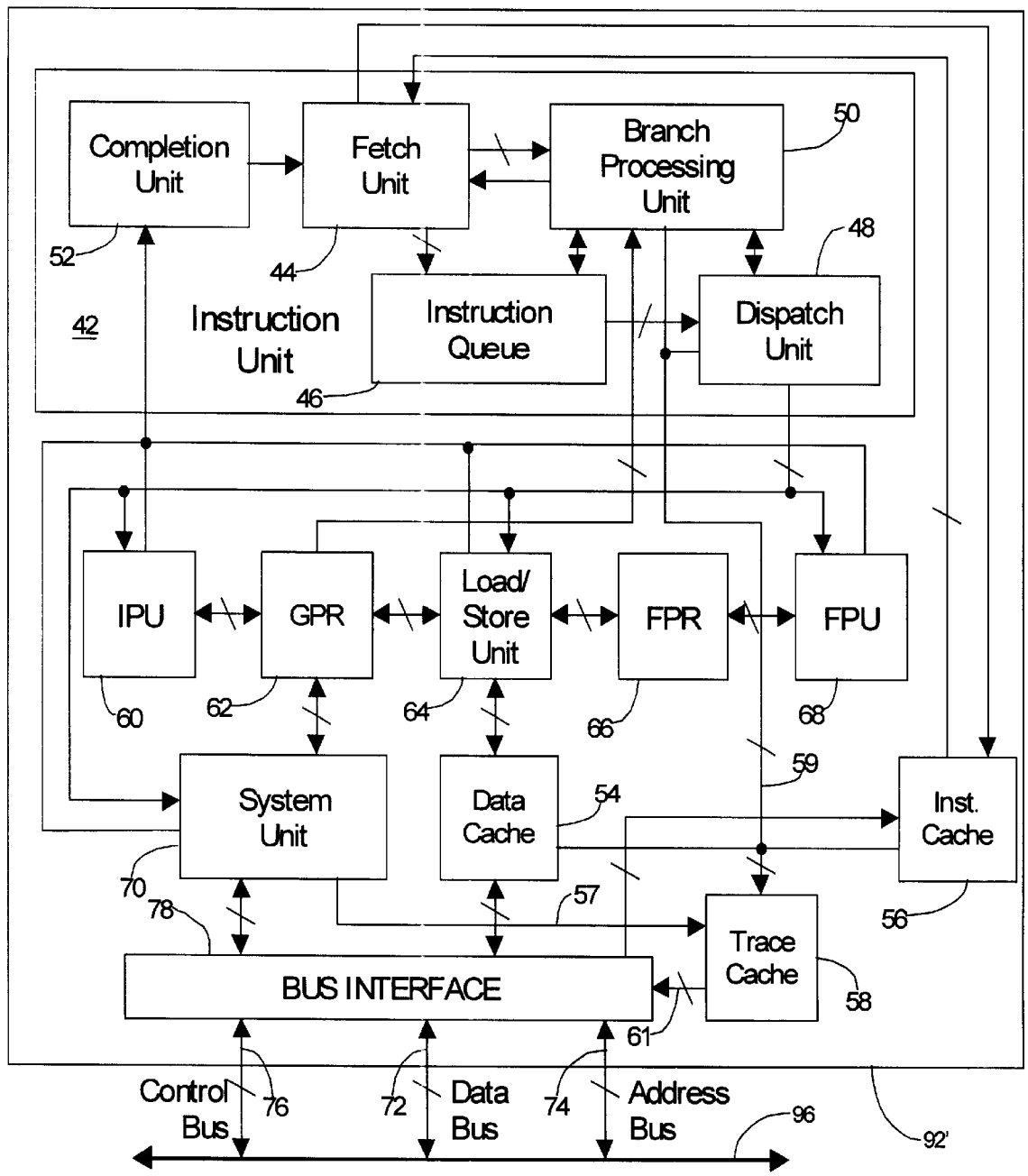
FIG. 6 is a block diagram of a piplelined processor as shown in FIG. 3.

FIG. 6 is a block diagram of an alternate embodiment of the processor 92 as shown in FIG. 3. This alternate embodiment shows a piplelined processor 92' capable of simultaneously executing multiple instructions. The processor 92' is coupled to a bus 96. The bus 96 comprises a data bus 72, a address bus 74, and a control bus 76. Such a bus 96 is typically implemented as a hierarchy of busses. In this instance, the data bus 72, address bus 74, and control bus 76 together comprise a processor bus. The data bus 72, the address bus 74 and the control bus 76 are coupled to a bus interface 56. The bus interface 56 is coupled to a data cache 54, an instruction cache 56, and a trace cache 58. The data cache 54, the instruction cache 56, and the trace cache 58 are typically constructed of high speed SRAM. The coupling between the data cache 54 and the bus interface 58 is typically bidirectional, whereas the coupling between the bus interface 58 and the instruction cache 56 is typically single directional, since there is typically no need to write instructions back to slower memory (not shown). As noted in FIG. 3, the Instruction Cache 56, and Data Cache 54 are Level 1 caches in the memory hierarchy in the preferred embodiment.

The instruction cache 56 is coupled to and provides instructions to an instruction execution unit 52. The instruction execution unit 52 shown preferably provides for pipelined execution of multiple instructions, synchronization of out-of-order execution, and branch prediction. However, these optimizations are not necessary to practice this invention. The instruction execution unit 52 provides control signals to control execution of an Integer Processing Unit 60, a load/store unit 64, a floating point unit 68, and a systems unit 70. The load/store unit 64 is bidirectionally coupled to the general purpose registers 62, the floating point registers 66 and the data cache 54. The load/store unit 64 loads values into the general purpose registers 62 and floating point registers 66 from the data cache 54, and writes them back to the data cache 54, as required.

The general-purpose registers 62 are bidirectionally coupled to and utilized by the integer-processing unit 60 to perform integer arithmetic, as well as other logical functions. Such an integer processing unit 60 typically comprises logical/shift modules, integer addition/subtraction modules, and integer multiplication/division modules. The integer processing unit 60 will typically set condition code flags in one or more condition code registers in the general purpose registers 62 based on the results of the arithmetic and logical functions performed. These condition code flags are provided to the instruction execution unit 52 for use in conditional branching. In this preferred embodiment, the integer processing unit 60 provides for arithmetic and logical functions. The general-purpose registers 62 are also bidirectionally coupled to and utilized by the systems unit 70 to perform systems functions. The systems unit 70 executes various system-level instructions, including instructions to change environment or state. In order to maintain system state, most of the instructions executed by the systems unit 70 are completion-serialized. The floating point registers 66 are bidirectionally coupled to and utilized by the floating-point unit 68 to perform floating-point arithmetic functions.

A single integer processing unit 60 and floating point unit 68 are shown in this FIG. This is done here for clarity. It should be understood that the preferred embodiment of the present invention will include multiple such functional units 60, 66. A pipelined processor 92' such as shown here will typically contain multiple integer processing units 60 providing multiple concurrent integer computations, and multiple floating point units 68 providing multiple concurrent floating point computations.

The Instruction Unit 42 comprises an instruction fetch unit 44, an instruction queue 46, an instruction dispatch unit 48, a branch processing unit 50, and an instruction completion unit 52. The instruction fetch unit 44 is coupled to and receives instructions from the instruction cache 56. The instructions fetch unit 44 provides instruction fetch control signals to the instruction cache 56. Fetched instructions are transmitted upon demand from the instruction fetch unit 44 to the instruction queue 46 for queuing. The queued instructions are subsequently removed from the instruction queue 46 and dispatched to the function units 60, 64, 68, 70 for processing by the instruction dispatch unit 48. Multiple instructions will typically be in simultaneous execution at the same time in a pipelined system. Upon completion of each of the dispatched instructions, the completing function units 60, 64, 68, 70 provide instruction completion signals to the instruction completion unit 52. The instruction completion unit 52 is coupled to and thereupon notifies the instruction fetch unit 44 of the instruction completions, allowing for further instruction fetches.

The branch-processing unit 50 is bidirectionally coupled to and receives branch instructions from the instruction fetch unit 44. The branch-processing unit 50 is coupled to and receives condition code information from the general-purpose registers 62. This condition code information is utilized by the branch-processing unit 50 to perform conditional branching. Modern branch processing units 50 in piplelined systems typically perform branch prediction and lookahead. When using branch prediction, a branch-processing unit 50 will typically provide control signals to the instruction fetch unit 44 to continue to fetch instructions until an unresolved conditional branch is resolved. The contents of general-purpose registers 62 are also received by the branch-processing unit 50 for use in indexed and indirect branching.

The systems unit 70 executes a number of instructions that are significant to the present invention. It executes a transmit sync (TSYNC) instruction for transmitting a synchronize signal to the other processors 92 in the system 80. It executes a wait-for-synchronize (WSYNC) instruction for pausing a processor 92 until it receives the synchronize signal from another processor 92. It executes a delay (DELAY) instruction for pausing or delaying a processor 92, 92' for a specified number of instruction. Finally, the systems unit 70 executes a trace (TRACE) instruction for controlling operation of the trace cache 58.

The trace cache 58 receives trace signals 59 from different modules in the processor 92. Each of these modules provides information that can be potentially traced. In the embodiment shown in FIG. 6, the trace cache 92 is coupled to and receives trace signals 59 from the data cache 54, the instruction cache 56, the branch processing unit 50, and the dispatch unit 48. The trace signals 59 from the data cache 54 and the instruction cache 56 include internal cache state signals. This provides a mechanism for recording in real time state changes for the cache memories 54, 56. The trace cache is coupled to and provides a trace output signal 61 to the bus interface 78. This allows the contents of a trace buffer to be selectively written to and saved in slower speed memory 24 in an MMU 84. This is typically done at the end of a trace so that the data traced can be processed.

Figure 7:
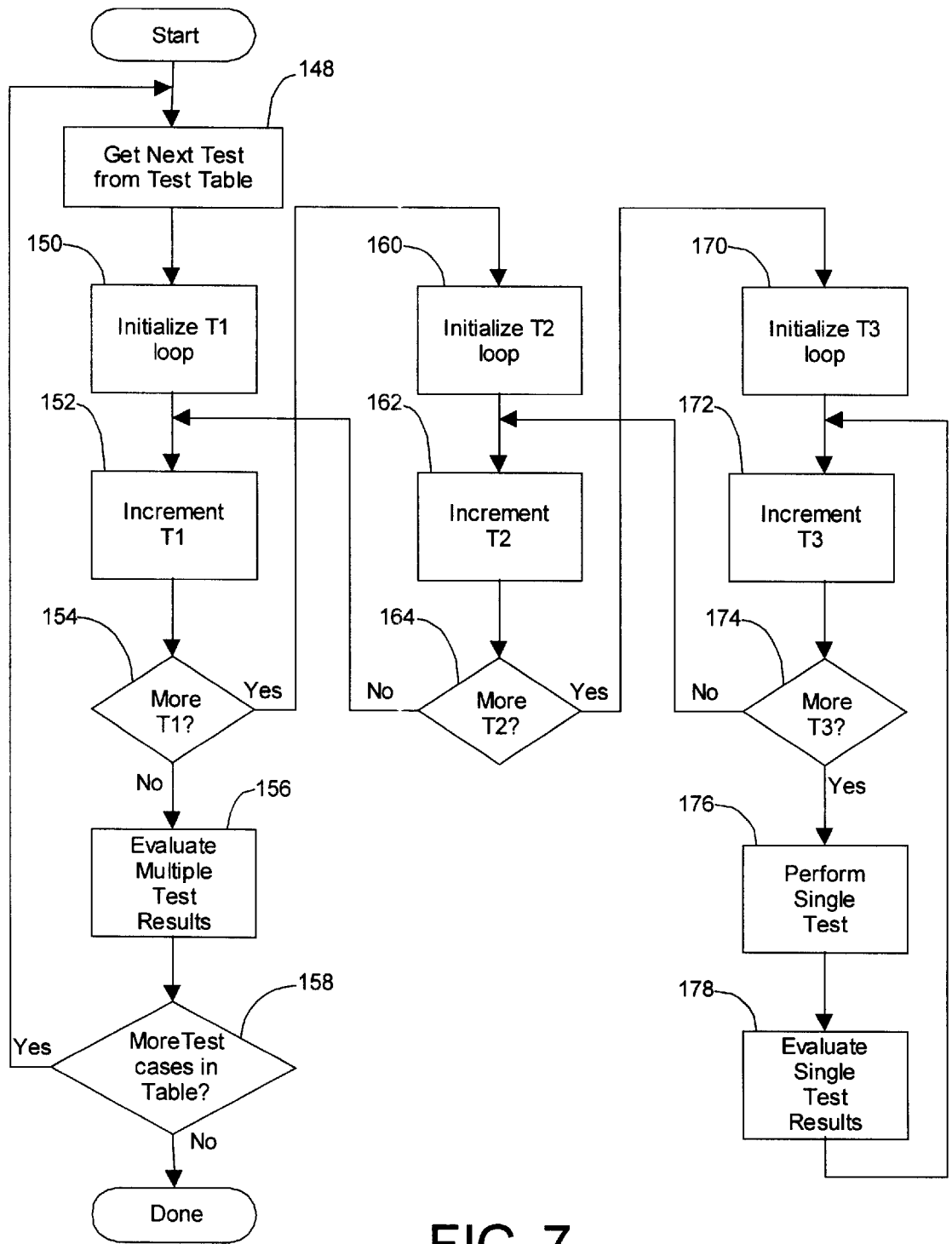
FIG. 7 is a flowchart illustrating exhaustive testing of the interaction between multiple processors in a single system, in accordance with the present invention.

FIG. 7 is a flowchart illustrating exhaustive testing of the interaction between multiple processors 92 in a single system 80. Table T-1 illustrates the instructions executed by three different processors 92.

TABLE T-1

| T | Processor #1 Instructions | Processor #2 Instructions | Processor #3 Instructions |
|---|---|---|---|
| 1 | TSYNC | | |
| 2 | WSYNC | WSYNC | WSYNC |
| 3 | DELAY T1 | DELAY T2 | DELAY T3 |
| 4 – n | <test#1 code> | <test#2 code> | <test#3 code> |
| n + 1 | TRACE Done | TRACE Done | TRACE Done |

In order to exhaustively test the interaction among multiple processors 92, the above sequence of code can be executed on each of the processors 92. One of the processors (here processor #1) executes a TSYNC instruction, which transmits a synchronize signal to all of the other processors 92 in the system 80. All of the processors being tested, including the processor executing the TSYNC instruction, then wait for receipt of the synchronize signal through execution of an WSYNC instruction. At this point, all of these processors are synchronized each being ready to execute their next instruction at the next common clock 99 signal edge. Each processor then starts the relevant traces by executing a TRACE instruction and delays for a specified number of clock 99 cycles by executing a DELAY instruction. Note that since each of the tested processors executes an WSYNC, TRACE, and DELAY instruction for each test run, any two or more of these instructions may be combined into a single instruction. For example, the WSYNC instruction may be implemented as having a clock count delay operand, resulting in a specified number of clock cycles of delay after receipt of the synchronize signal. In the preferred embodiment, the WSYNC instruction both waits for the synchronize signal, and then starts tracing. Two-hundred fifty-six (256) trace entries are then traced, and the trace then automatically terminates. Note also that the traces may be started earlier, especially if trace entries are allowed to wrap around the trace RAM 210. The exhaustive testing is accomplished by varying T1, T2, and T3 for the three processors through their respective ranges. This is preferably done through use of a three level loop structure in a test driver program.

After each processor 92 is synchronized with the other processors 92, has delayed its proscribed number of clock 99 cycles, and has the appropriate traces turned on, each of the processors 92 will execute a series of test instructions. For example, when testing cache memories 54, 56, the processors 92 will execute instructions affecting the state of the cache 256. The processors implementing such cache memory testing may cause their respective caches 256, to compete for ownership of a given range of addresses of memory. The cache states for the relevant caches 256 are received on the trace input signal lines 59 by the Trace Cache 58 and written into the trace RAM 210 every clock 99 cycle during the test. At the end of the test, the trace is turned off by either writing a predetermined number of trace entries to the Trace RAM 210, filling up the Trace RAM 210 with trace entries, or execution of a second TRACE instruction. In any case, the contents of the Trace RAM 210 for each of the processors 92 is then written to slower (usually DRAM) memory 24 contained in the MMU modules 84 for subsequent evaluation. The trace entries saved in the MMU module 84 memories may also be written to secondary storage 80 for later evaluation, or for archival purposes. The testing is then run again, with a different combination of T1, T2, and T3 values for the three processors. This is repeated until all interesting combinations of these three timing delay values have been tested.

FIG. 7 is a flowchart illustrating a method of exhaustive testing of the interaction between multiple processors 92 in a single system 80. The method utilizes the code shown and discussed in Table T-1. In this test example, the interaction of three processors 92, P1, P2, and P3 is tested. Each of the three processors 92 utilizes a corresponding delay value T1, T2, and T3, for delaying the execution of its test code. The method starts by entering an outer loop. First, the next test cases are loaded from a test table, step 148. Next, a T1 delay value loop index is initialized, step 150. A second loop is then entered. The T1 delay value is then incremented, step 152, and a test is made whether the T1 delay value is within range, step 154. If the T1 delay value is within a range specified in the test table entry, step 154, a third loop is entered. In the third loop, the T2 delay value is first initialized, step 160. The T2 delay value is then incremented, step 162, and a test is made whether the T2 delay value is within range, step 164. If the T2 delay value is within a range specified in the test table entry, step 164, a fourth, inner, loop is entered. In the fourth loop, the T3 delay value is first initialized, step 170. The T3 delay value is then incremented, step 172, and a test is made whether the T3 delay value is within range, step 174. If the T3 delay value is within a range specified in the test table entry, step 174, a single test is performed, as shown in Table T-1, step 176, utilizing the T1, T2, and T3 delay values computed in the three embedded loops. At the end of the single test, the single test run results are evaluated, as appropriate, step 178. The inner loop then repeats, starting with incrementing the T3 delay value, step 172. When the T3 delay value exceeds its specified range, step 174, the fourth loop is complete, and the third loop is repeated, starting with incrementing the T2 delay value, step 162. When the T2 delay value exceeds its specified range, step 164, the third loop is complete, and the second loop is repeated, starting with incrementing the T1 delay value, step 152. When the T1 delay value exceeds its specified range, step 154, the second loop is complete. At this point in the method, the interaction over the specified ranges of T1, T2, and T3 for a particular test case in the test table have been exhaustively tested. The test results from the multiple tests are then evaluated, step 178. A test is then made whether there are any more test cases to test in the test table, step 158. If there are more test cases to test, the outer loop is repeated, starting with loading the next test entry from the test table, step 148. Otherwise, when there are no more test cases to test in the test table, step 158, the method is complete. It should be noted that the three embedded loops can be viewed as three embedded "DO" or "FOR" loops, incrementing T1, T2, and T3 through their prescribed ranges. The use of these three embedded loops for testing three processors is for illustrative purposes only. More or fewer embedded loops, for testing correspondingly more or fewer processors, are within the scope of the present invention.

Figure 8:
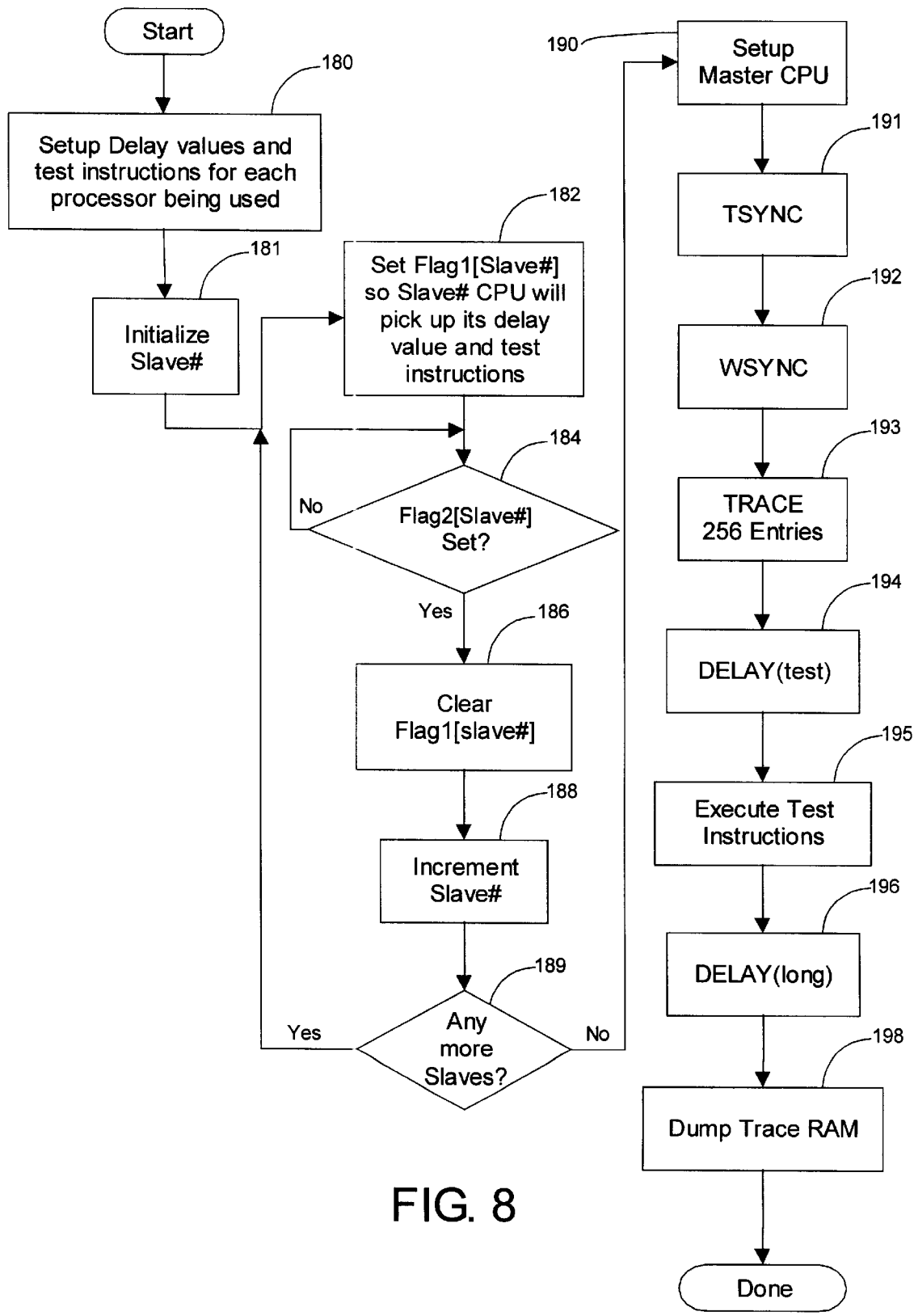
FIG. 8 is a flowchart illustrating operation of a master processor during one execution of the Perform Single Test step in FIG. 7.

FIG. 8 is a flowchart illustrating operation of a master processor during one execution of the Perform Single Test step 176 in FIG. 7. The Perform Single Test, step 176, starts by setting up the delay values and test instructions for each processor being utilized, step 180. In the example in FIG. 7, the delay values for the three processors are the loop indices: T1, T2, and T3. The test instructions for a given test typically remain constant throughout a given set of tests. A slave number (Slave#) loop index is initialized, step 181, and a loop is then entered. At the top of the loop, a Flag 1 corresponding to the slave being setup (Flag1[Slave#]) is set so that that slave will know to pick up its delay and test instructions, step 182. The master processor then spins on a second flag (Flag2[Slave#]) until that second flag is set, step 184. The second flag (Flag2[Slave#]) is set by the slave processor when it has completed setting up for testing, and is ready to execute a WSYNC instruction (see step 144 in FIG. 9). The first flag (Flag1[Slave#]) is then cleared, step 186, for preparation for the next execution of the Perform Single Test, step 176. The Slave# loop index is then incremented, step 188, and a test is made whether any more slaves need to be setup. If more slaves remain to setup, the loop is repeated, setting up the next slave, starting with step 182.

When no more slaves remain to be setup, step 189, the master processor is setup, step 190. This setup is similar to the setup performed for each of the slave processors. In particular, the test delay value is typically loaded into a register. After setting up for testing, a TSYNC instruction is executed, step 191, resulting in a synchronize signal being transmitted to all of the processors 92 in the data processing system 80. This is followed by execution of a WSYNC instruction, step 192, which awaits receipt of the synchronize signal just transmitted. Upon receipt of the synchronize interrupt, a TRACE is initiated, tracing 256 entries to the Trace RAM Execution of the WSYNC will also preferably turn on tracing to the TRACE RAM, step 193. In this FIG., the TSYNC, 191, WSYNC, 192, and TRACE, 193, are shown separately. This is for illustrative purposes. In the preferred embodiment, these three functions are combined into the TSYNC instruction. After the synchronize signal has been received, and tracing started to the trace RAM 210, step 193, a DELAY instruction is executed in order to delay for a predetermined number of clock cycles, step 194. This is the delay value for the master processor resulting from the T1, T2, and T3 loops in FIG. 7. In the preferred embodiment, the delay value has been loaded into a register prior to executing the TSYNC, step 191, WSYNC, step 192, and TRACE, step 193, instructions. After the DELAY instruction, step 194, has completed waiting the prescribed number of clock cycles, the prespecified instruction test sequence is executed, step 195. Then, a second DELAY instruction is executed, step 196, for a long enough delay that all processors 92 being tested have completed their individual test. The Trace RAM 210 is then dumped to the system RAM, step 198, for later evaluation. Note that instead of the second DELAY instruction, step 196, other methods of processor 92 resynchronization may also be utilized, such as a second usage of the TSYNC and WSYNC instructions.

Figure 9:
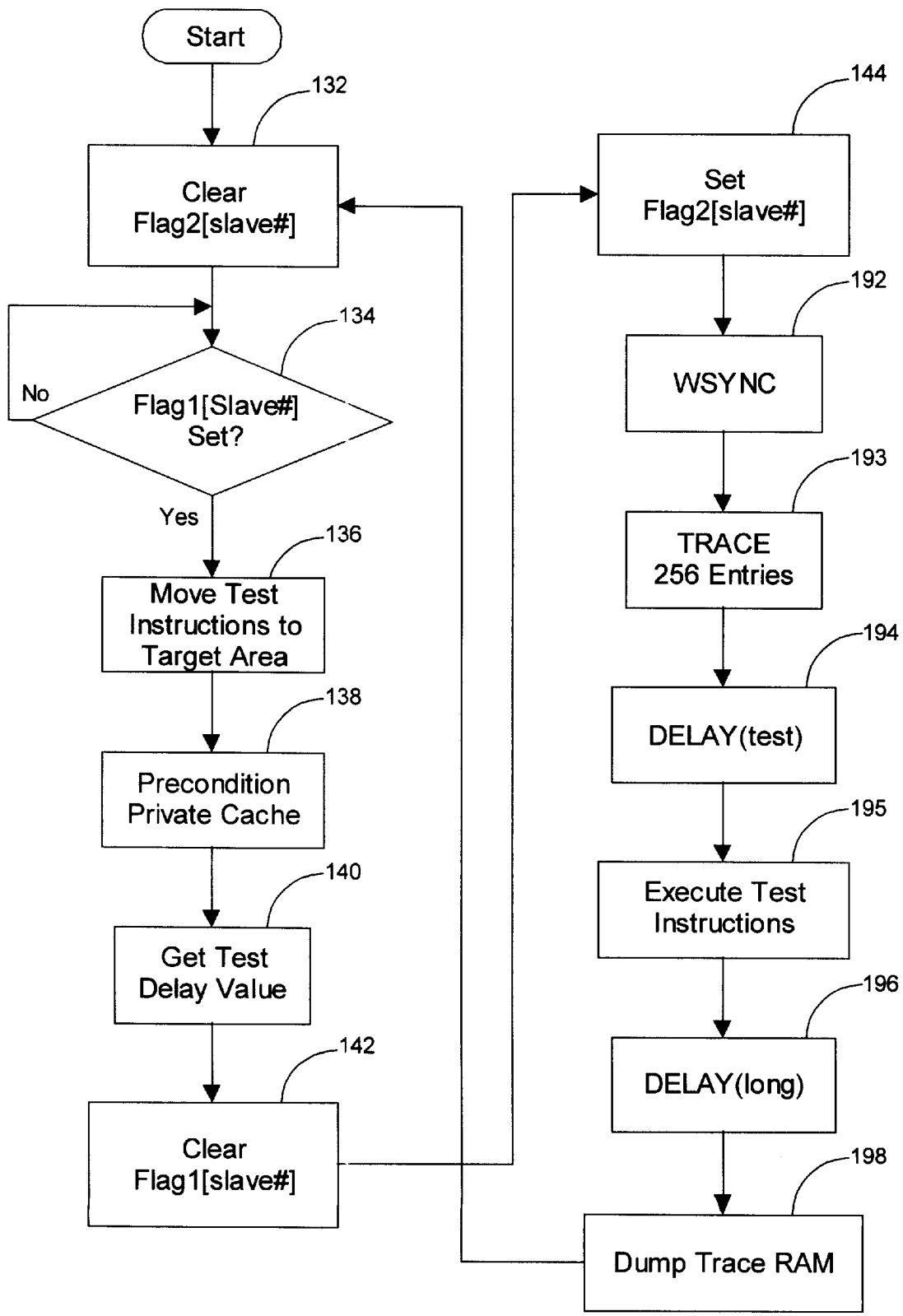
FIG. 9 is a flowchart illustrating operation of a slave processor during execution of multiple tests.

FIG. 9 is a flowchart illustrating operation of a slave processor during execution of multiple tests. The slave computer executes a continuous loop until terminated. At the top of the loop, the second flag (Flag2[Slave#]) for the slave processor is cleared, step 132. Then, the processor 92 spins until the first flag (Flag1[Slave#]) is set, indicating that a new set of delay values and test instructions is ready for use by this slave. The test instructions are then moved to a target area, step 136. The private cache 256 is preconditioned, step 138. This is especially important if the caching system is being tested. The test delay value is then loaded into a register, step 140. The first flag (Flag1[Slave#]) is then cleared, step 142, and the second flag (Flag2[Slave#]) is then set, step 144, indicating that the slave processor is ready for testing. The processor 92 then awaits synchronization by executing a WSYNC instruction, step 192. After receiving the synchronization signal transmitted as a result of the TSYNC instruction executed by the master processor, step 191, a TRACE instruction is executed, step 193, starting tracing to the Trace RAM 210, and a DELAY instruction is executed, step 194, delaying the number of clock cycles specified by the master processor. The test instructions for the slave processor are then executed, step 195, and a long delay is then entered, again by executing the DELAY instruction, step 196. Upon completion of the second DELAY instruction, step 196, the Trace RAM 210 is dumped to the system RAM, step 198, and the loop repeats, starting with clearing the second flag (Flag2[Slave#]). In this FIG., the WSYNC instruction, step 192, and the TRACE instruction, step 193, are shown as separate steps. This is illustrative. In the preferred embodiment, the functionality of both steps are combined into the WSYNC instruction.

Figure 10:
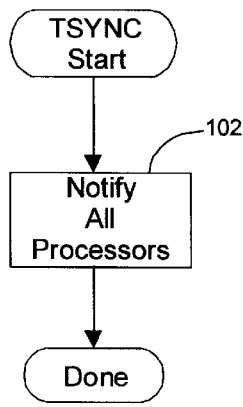
FIG. 10 is a flowchart illustrating operation of a Transmit Sync signal (TSYNC) instruction, in accordance with the present invention.
Figure 15:
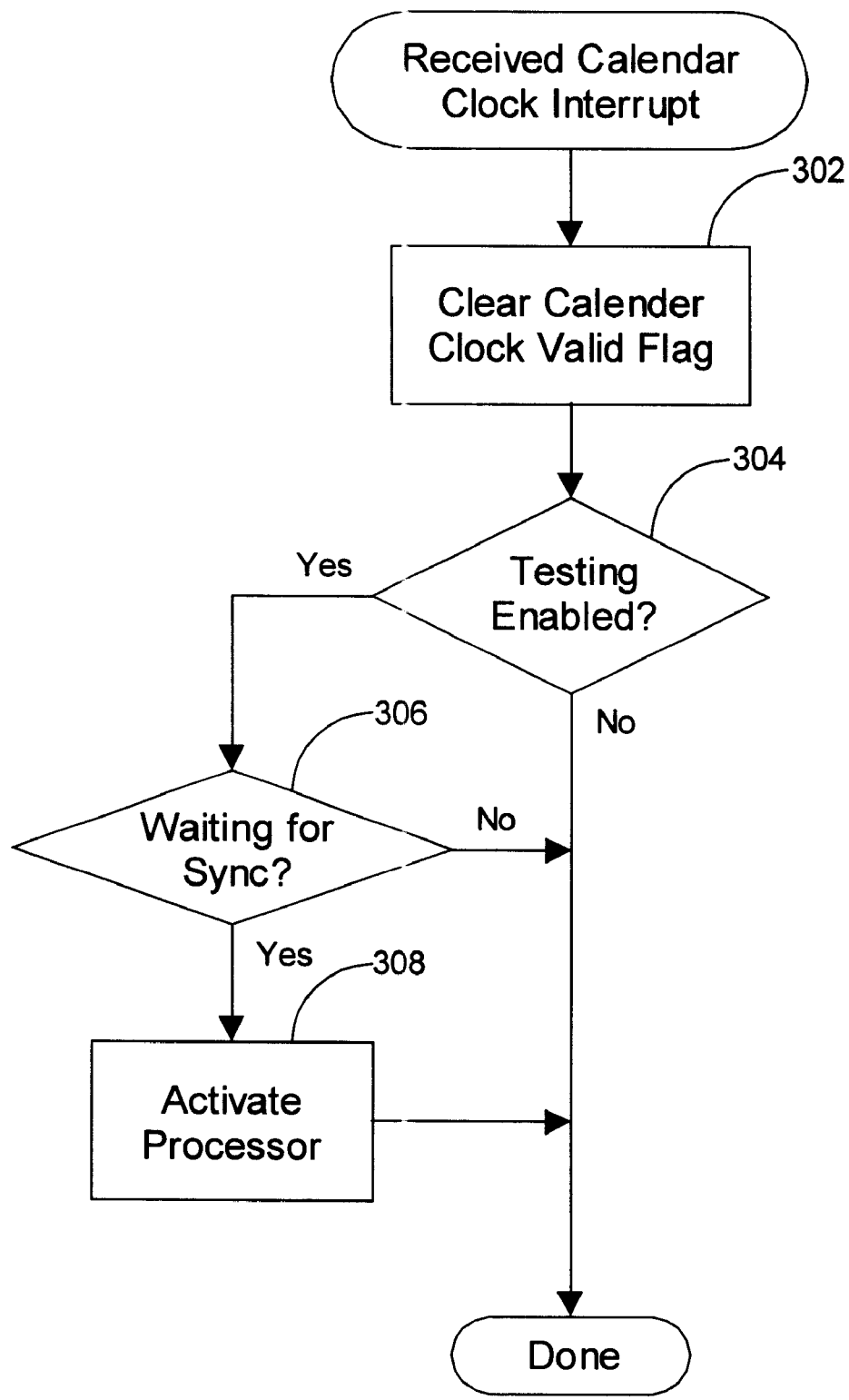
FIG. 15 is a flowchart illustrating operation of a processor after receiving a calendar clock interrupt, in accordance with the present invention.

FIG. 10 is a flowchart illustrating operation of a Transmit Sync signal (TSYNC) instruction. A special synchronize interrupt signal is transmitted to each of the processors 92 in the system 80. Note that the synchronize interrupt signal is also broadcast to the processor 20 executing the TSYNC instruction. In the flowchart, a signal is transmitted to all processors 92, step 102, in the data processing system 80. In the preferred embodiment, the synchronize interrupt signal is transmitted as the Transmit Calendar Clock Updated signal 276 from the processor 92 executing the TSYNC instruction, and received by all the processors 92 in the data processing system 80 as the Receive Calendar Clock Updated signal 278. FIG. 15 illustrates operation in the preferred embodiment of each of the processors as it receives the Calendar Clock Updated interrupt signal 278. Finally, in the preferred embodiment, the TSYNC instruction continues execution after step 102 by dropping into the WSYNC instruction functionality shown in FIG. 11.

Figure 11:
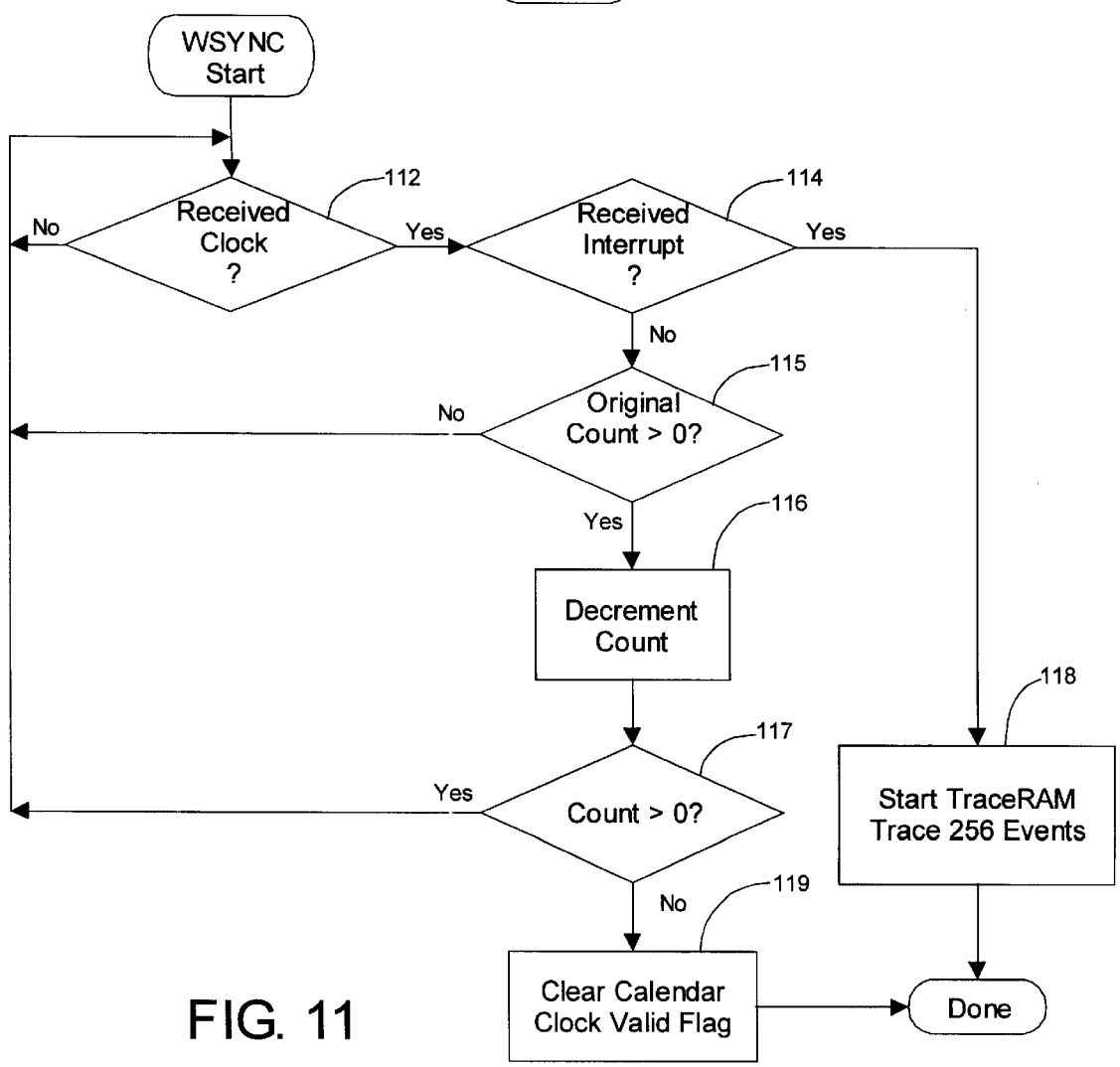
FIG. 11 is a flowchart illustrating operation of a Receive Sync signal (WSYNC) instruction, in accordance with the present invention.

FIG. 11 is a flowchart illustrating operation of a Wait for Sync signal (WSYNC) instruction. As noted above, execution of the TSYNC instruction shown in FIG. 10 drops into this functionality. In the preferred embodiment, the WSYNC and TSYNC instructions contain a maximum cycle count operand. This maximum cycle count operand can optionally be implemented as a register operand, an immediate operand, a sum of multiple registers, a sum of a register and an immediate operand, or indeed as any other type of operand supported by the architecture of the processors 92 in the data processing system 80. When a zero maximum cycle count operand is encountered during execution, the WSYNC instruction only terminates when the synchronize interrupt is received. When a maximum cycle count operand greater than zero is encountered, a maximum cycle count is indicated. The instruction will thus terminate after that delay maximum cycle count of cycles have been encountered, or when the synchronize interrupt is received, which ever comes first. Thus, a zero maximum cycle count operand can be viewed as an infinite maximum wait. If the maximum cycle count operand was loaded from a register, that register will receive the remaining number cycle count at the end of instruction execution. Thus, if the instruction terminates with a zero remaining cycle count stored in that register, and started with a maximum cycle count greater than zero, the instruction terminated due to having decremented the counter, and not from having received the synchronize interrupt.

The WSYNC instruction effectively starts operation by entering into a loop. First, a check is made of the clock signal 99, step 112. If the relevant edge of the clock signal 99 has not been encountered, step 112, the loop is repeated, starting with the test whether the clock signal 99 edge has been received, step 112. Otherwise, a test is made whether the synchronize signal has been received, step 114. If the synchronize signal has not been received, step 114, a test is made whether the maximum cycle count operand was greater than zero, step 115. If the initial maximum cycle count operand was not greater than zero, step 115, the loop repeats, starting at step 112. However, if the original maximum cycle count operand was greater than zero, step 115, a timeout count is indicated. A register is loaded with the maximum cycle count value, and decremented step 116, and tested against zero, step 117, at every clock. As long as the decremented remaining cycle count is greater than zero, step 117, the loop repeats, starting at step 112. Otherwise, when the synchronize interrupt has been received, step 114, tracing is started, step 118, and the loop terminates. In the preferred embodiment, 256 events are recorded in the Trace RAM, before the tracing is automatically terminated. Otherwise, if the remaining cycle count decrements to zero, step 117, the Calendar Clock Valid Flag 274 is cleared, step 119, and the loop terminates. Since the Calendar Clock Valid Flag 274 is automatically cleared whenever the Calendar Clock Updated interrupt signal 278 is received (see step 302 in FIG. 15, step 119 guarantees that the WSYNC instruction always exits with the Calendar Clock Valid Flag 274 in a safe state that guarantees that the next Read Calendar Clock instruction will read the Master Calendar Clock 97 instead of the cached calendar clock 272 (see FIG. 16). In the case of an initial maximum cycle count greater than zero, at the termination of the instruction execution, the remaining cycle count is made available in a register to provide an indication whether the WSYNC instruction terminated through a timeout, or through receipt of the synchronize interrupt.

It should also be noted that a test is made for receipt of the synchronize signal on the clock 99 edge. This is to guarantee that all processors 92 receive and respond to the synchronize signal at exactly the same time. Secondly, note that in the flowchart a tight loop is shown where the executing processor spins, waiting for clock edges, step 112. This is for illustrative purposes. In the preferred embodiment, the WSYNC instruction is implemented utilizing a microcode engine 280 that executes a series of instructions implementing the remainder of the flowchart at each system clock cycle until the instruction terminates. Finally, as noted above in FIG. 10, in the preferred embodiment, the synchronize signal is implemented as the hardware Receive Calendar Clock Updated interrupt signal 278.

Figure 12:
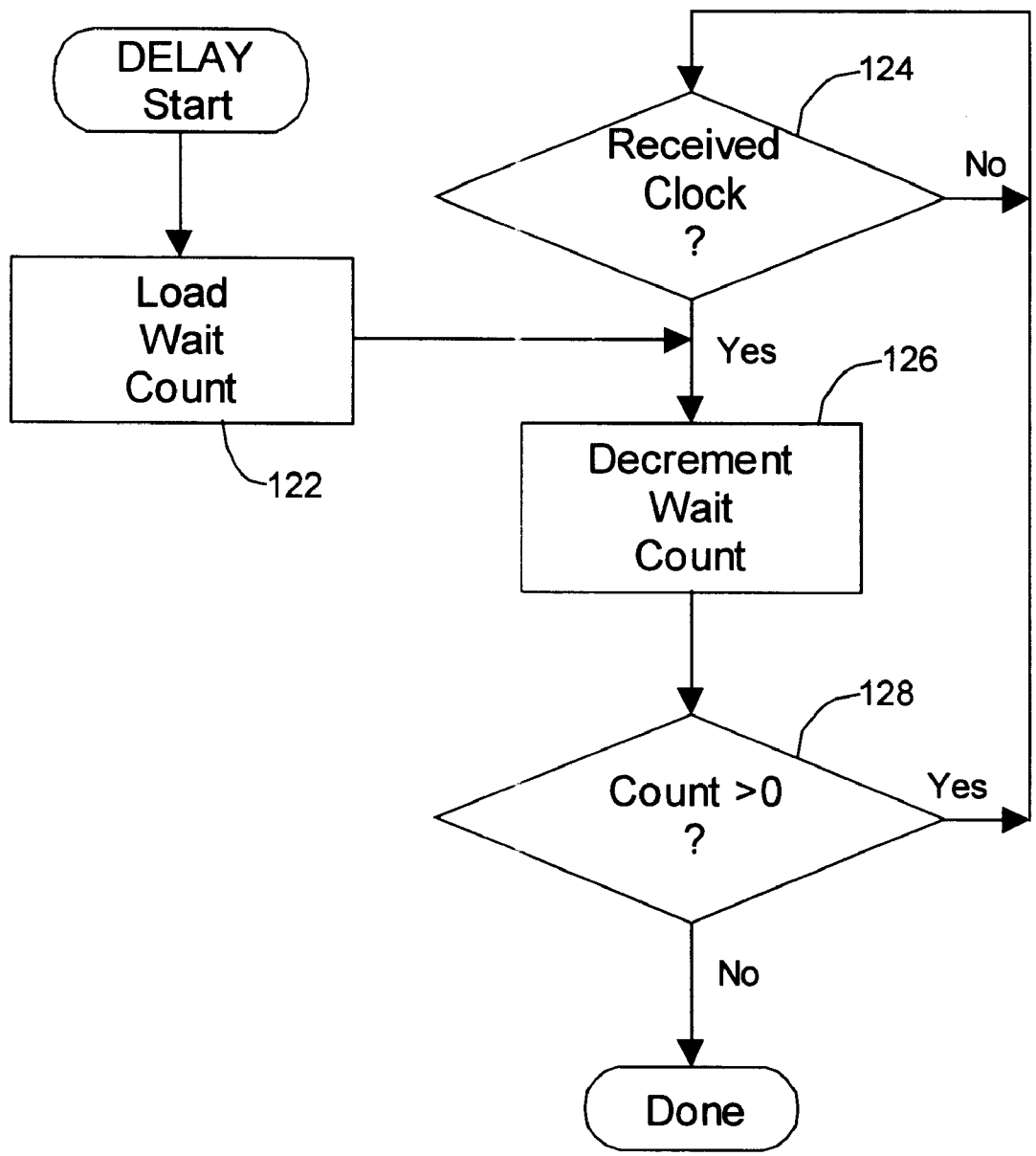
FIG. 12 is a flowchart illustrating operation of a delay (DELAY) instruction, in accordance with the present invention.

FIG. 12 is a flowchart illustrating operation of a delay (DELAY) instruction. The DELAY instruction has one or more operands to specify the number of instruction cycles to delay. This set of operands specifying the number of cycles to delay may be coded as an immediate operand, a register operand, the sum of a pair of registers, the sum of a register and an immediate operand, or indeed, any form of operand supported by the architecture. In an alternative embodiment, the number of cycles to delay can be specified in a fixed repeat count register. The DELAY instruction starts by loading the number of cycles to delay into a counter containing a remaining cycle delay count, step 122. A loop is then entered, and the remaining cycle delay count is decremented, step 126. A test is then made, comparing the remaining cycle delay count to zero. If the remaining cycle delay count is greater than or equal to zero (i.e. has not gone negative), step 128, the loop is repeated, starting with a test of the relevant edge of the clock signal 99. The loop spins, waiting for the relevant clock 99 edge. When the clock edge is detected, step 124, the remaining cycle delay count is again decremented, step 126, and again tested, step 128. The loop exits when the decrementing, step 126, causes the remaining cycle delay count to go negative, step 128. The result is that the instruction delays for exactly "N" clock 99 cycles, with "N" being the number of cycles to delay specified on the DELAY instruction. This provides a significant advantage when exhaustively testing interactions between multiple processors 92 since testing ranges can be known to have been exhaustively tested.

Figure 13:
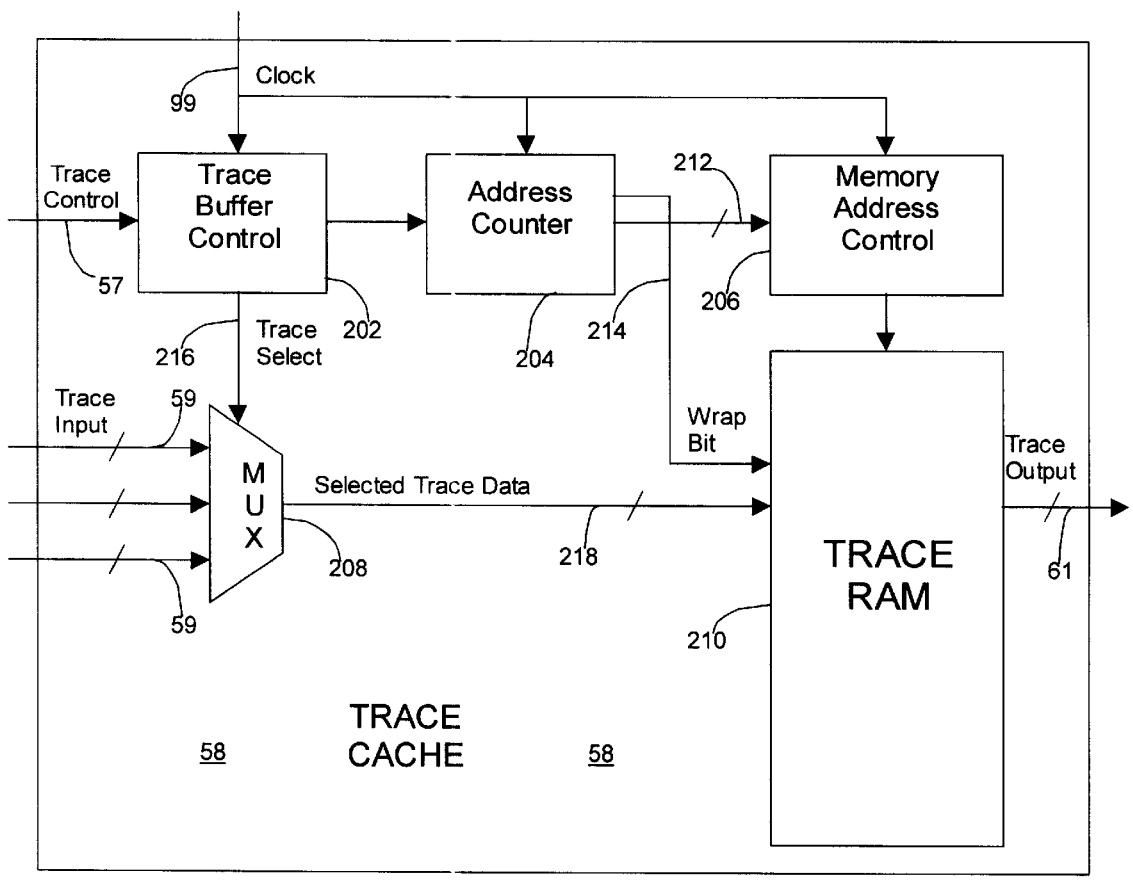
FIG. 13 is a block diagram illustrating the trace cache shown in FIGS. 4 and 6.

FIG. 13 is a block diagram illustrating the trace cache 58 shown in FIGS. 4 and 6. The systems unit 70 provides trace control signals 57 to a trace buffer control module 202 in response to execution of a Trace instruction. The trace buffer control module 202 provides control signals to an address counter module 204. The address counter module 204 is typically reset by the trace buffer control module 202 when a trace is started. The address counter module 204 is a counter that increments at each clock 99. Address counter module 204 selectively either wraps around, or terminates a trace, when it hits its limit. If the address counter module 204 terminates a trace, the completion is transmitted to the completion unit 52. In any case, the address counter module 204 provides an address signal 212 to a memory address control module 206. The address signal 212 provided is the address of the next trace entry in a trace RAM array 210 to receive data. The memory address control module 206 stores a single trace entry in the Trace RAM 210 at the address specified by the address signal 212 at assertion of each clock b signal.

Trace input signals 59 are coupled to and received by a multiplexor (MUX) 208. The trace buffer control module 202 is coupled to and provides trace select signals 216 to the MUX 208 to select trace input signals 59 for tracing. The selection by the trace buffer control module 202 is in response to execution of a TRACE instruction by the systems unit. The MUX 208 provides a Selected Trace Data signal 218 by selecting Trace input signals 59 in response to trace select signals 216. The values of the Selected Trace Data signals 218 are written in the Trace Ram 210 at the location specified by the address counter 204 at the assertion of each clock 99. In one embodiment, a high-order bit from the address counter module 204 is written with each trace entry in the trace RAM 210. This provides a mechanism for continuously wrapping the trace RAM 210 with trace entries. Then, when the trace data is downloaded to slower memory and evaluated, the trace entries can be properly unrolled based on this wrap bit 214, since the wrap bit 214 toggles for each cycle through the trace RAM 210.

The trace cache 58 operates by storing one entry into the trace RAM 210 for each assertion of the clock signal 99. The trace RAM is preferably high-speed memory, such as high speed Static Random Access Memory (SRAM), with a write time no longer than the width of the clock signal 99. The entire trace entry is typically a power of two ($2^x$) in size, such as 16, 32, 64, or 128 bits in size. The trace RAM will typically contain a power of two ($2^y$) number of trace entries. This allows for easy wrapping of the address counter 204 when computing memory write addresses 212. The trace RAM in the preferred embodiment contains 256 ($2^8$) trace entries.

One problem encountered when implementing multiple processors 92, 92' on multiple processor modules 84 is that access time to certain resources shared among the processors 92, 92' can become both lengthy and variable. Part of both the length and variability of time can be attributed to contention over a shared bus 82. Some of the resources that are commonly shared are system clocks. In the preferred embodiment, as shown in FIG. 2, a plurality of clock signals 99 are generated for all of the processors 92, 92' in the system 80 with a clock generator 98.

One clock that is maintained by the system control unit (SCU) 86, but is only provided the processors 92, 92' upon request, is a calendar clock. In the preferred embodiment, a Master Calendar Clock 97 is maintained in the system control unit (SCU) 86. Two instructions are provided to access the calendar clock. A "Read Calendar Clock" (RCCL) instruction returns the current value of the calendar clock. A "Load Calendar Clock" (LCCL) instruction operates to load the common calendar clock with a new value. In this embodiment, the calendar clock comprises a seventy-two (72) bit counter that is incremented every microsecond. The clock signals driving that incrementation of the calendar clock every microsecond are typically either derived from a system clock, or provided by a separate oscillator.

It is important that all of the processors 92 in the data processing system 80 have the same calendar clock value. Among other reasons for this, this is important in enabling programs to be executed on different processors 92 at different times during their execution. As noted above though, in the currently disclosed data processing system 80, the time it takes to read the Master Calendar Clock 97 is lengthy and highly variable. In the preferred embodiment, this problem is solved by caching a copy of the calendar clock in each processor 92. The Cached Calendar Clock 272 is then incremented by each processor 92 utilizing the same clock signals 99 as used by the Master Calendar Clock 97. In the preferred embodiment, this is done every microsecond. Whenever a processor 92 updates the Master Calendar Clock 97, a Transmit Calendar Clock Updated signal 276 is transmitted from the cached calendar clock unit 270 of the updating processor 92. This signal is received as a Receive Calendar Clock Updated signal 278, via the bus 96, by all of the processor 92. This results in each of those processors 92 clearing its Cached Calendar Clock Valid flag 274. The next time that a program executing on any processor 92 reads the calendar clock, the cleared Cached Calendar Clock Valid flag 274 forces that processor 92 to request a current copy of the Master Calendar Clock 97. The result of this caching of the calendar clock in each processor 92 is that typical access times to the calendar clock are significantly reduced. This is because a processor 92 can utilize its own Cached Calendar Clock 272 for most reads of the calendar clock.

In the preferred embodiment of the present invention, the TSYNC and WSYNC instructions utilize the Transmit Calendar Clock Updated signal 276 and the Receive Transmit Calendar Clock Updated signal 278. If the processor 92 is in test mode, where the TSYNC and WSYNC instructions are operable, the TSYNC instruction is implemented by transmitting the Transmit Calendar Clock Updated signal 276 to each of the processors 92 in the data processing system 80. This signal is received by each processor 92 in the data processing system 80 as the Receive Transmit Calendar Clock Updated signal 278. When this signal 278 is utilized by any processors 92 waiting to terminate waiting for synchronization after executing the WSYNC instruction.

Figure 14:
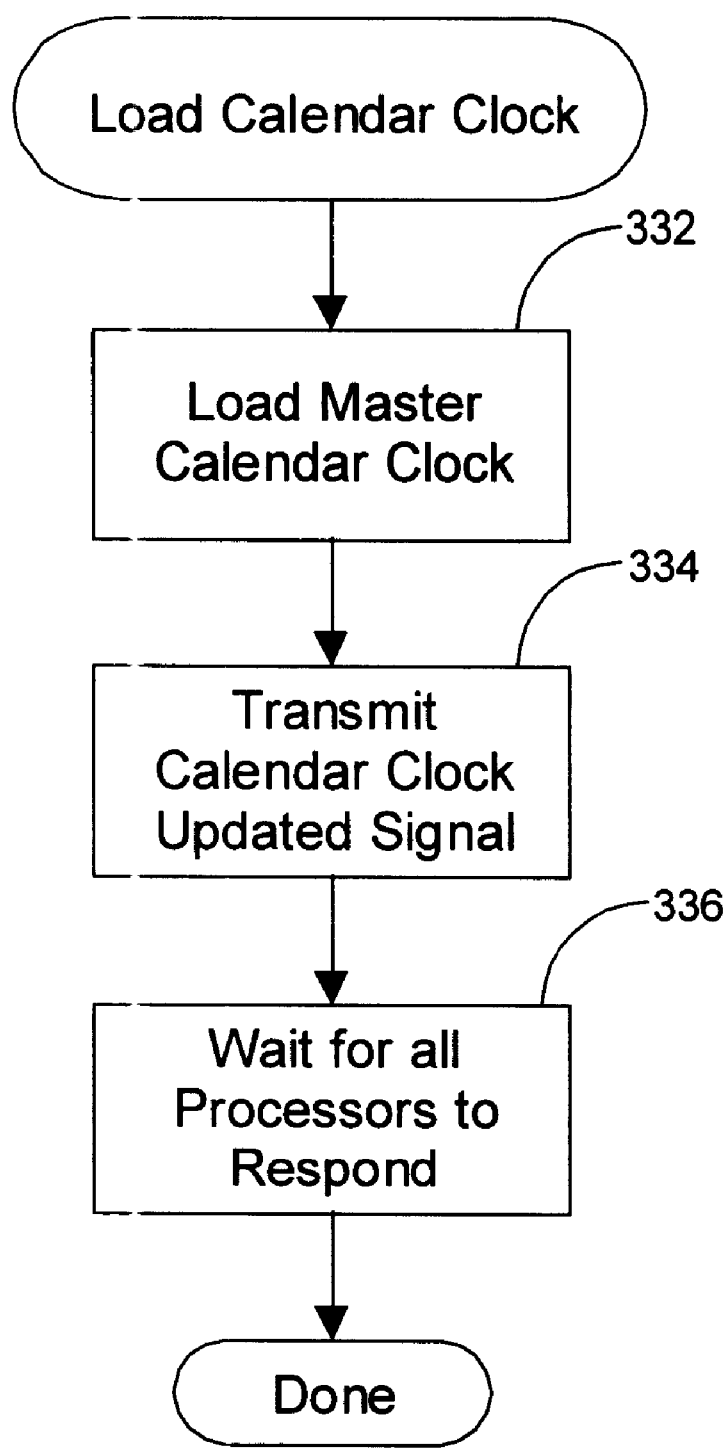
FIG. 14 is a flowchart illustrating operation of a Load Calendar Clock (LCCL) instruction, in accordance with the present invention.

FIG. 14 is a flowchart illustrating operation of a Load Calendar Clock (LCCL) instruction, in accordance with the present invention. When the Load Calendar Clock (LCCL) instruction is executed, the Master Calendar Clock 97 is loaded with the instruction operand as the new Master Calendar Clock 97 value, step 332. Simultaneously, the Transmit Calendar Clock Updated signal 276 is asserted by the processor 92 executing the Load Calendar Clock instruction, and transmitted to each of the processors 92 in the data processing system 80, step 334, where it is received as the Receive Calendar Clock Updated signal 278 (see FIG. 15). After the Master Calendar Clock 97 has been loaded, step 332, and the Calendar Clock Updated signal 276 has been transmitted, step 334, the processor executing the instruction waits for all other processors 97 in the data processing system 80 to acknowledge receipt of the Calendar Clock Updated interrupt signal 278, step 336. This later step 336, helps to guarantee that all processors 97 in the data processing system 80 have the same Calendar Clock value.

FIG. 15 is a flowchart illustrating operation of a processor 92 after receiving a Calendar Clock Updated interrupt signal 278, in accordance with the present invention. This Calendar Clock Updated interrupt signal 278 is received by each processor 92 in the data processing system 80 in response to one processor 92 transmitting the signal on its Transmit Calendar Clock Updated signal line 276. After the interrupt has been received by a processor, the Cached Calendar Clock Valid flag 274 is cleared for that processor 92, step 302. A test is then made whether testing is enabled, step 304. If testing is enabled, step 304, a test is made whether the processor 92 is waiting for synchronization, step 306, after having executed a WSYNC (or TSYNC in the preferred embodiment) instruction. If the processor 92 is waiting for synchronization, step 306, and testing is enabled, step 304, the processor is activated, step 308. The method in FIG. 15 is shown as a flowchart. However, this is for illustrative purposes. In the preferred embodiment, the method is implemented as a combination of hardware and firmware. In particular, note that the Cached Calendar Clock Valid flag 274 is automatically cleared whenever the Calendar Clock Updated interrupt signal 276 is received. Then, when waiting for Sync, step 306, the processor is activated, step 308, when it tests the Calendar Clock Valid flag 274 at the next clock cycle (see step 114 in FIG. 11).

Figure 16:
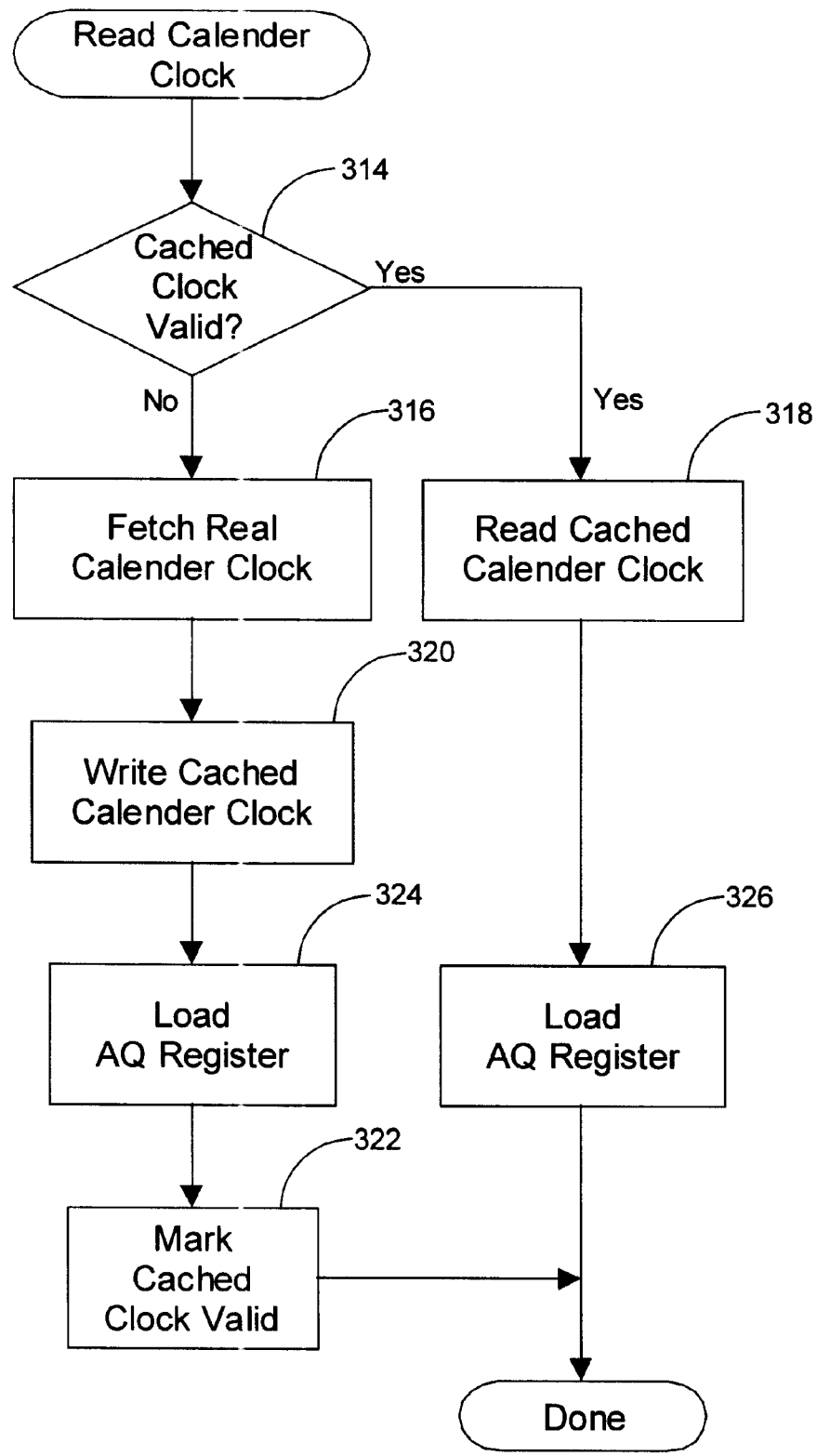
FIG. 16 is a flowchart illustrating operation of a Read Calendar Clock (RCCL) instruction, in accordance with the present invention.

FIG. 16 is a flowchart illustrating operation of a Read Calendar Clock (RCCL) instruction, in accordance with the present invention. When the Read Calendar Clock (RCCL) instruction is executed by a processor 92, a test is then made whether the Cached Calendar Clock Valid flag 274 is set, step 314. If the Cached Calendar Clock Valid flag 314 is set, step 264, the Cached Calendar Clock 272 is read, step 318, and loaded into an AQ register, step 326. Otherwise, if the Cached Calendar Clock Valid flag 274 is not set, step 314, the calendar clock value is read from the Master Calendar Clock 97, step 316, and written to the Cached Calendar Clock 272, step 320. The calendar clock value is loaded into an AQ register, step 324, and the Cached Calendar Clock 272 is marked valid by setting the Cached Calendar Clock Valid flag 274, step 322. In either case, the instruction returns the current calendar clock value in the AQ register.

The above instructions were shown in their corresponding FIGS. implemented sequentially in flowcharts. Sequential flowcharts are used there solely for illustrative purposes. In the preferred embodiment, these instructions are implemented as a combination of firmware executed as microcode, and hardware. As such, steps in the flowcharts that appear to be sequential in the FIGS. may be executed in parallel in the preferred embodiment.

Those skilled in the art will recognize that modifications and variations can be made without departing from the spirit of the invention. Therefore, it is intended that this invention encompasses all such variations and modifications as fall within the scope of the appended claims.

Claim elements and steps herein have been numbered and/or lettered solely as an aid in readability and understanding. As such, the numbering and/or lettering in itself is not intended to and should not be taken to indicate the ordering of elements and/or steps in the claims.

What is claimed is:

1. A processor in a data processing system capable of executing a DELAY instruction, wherein:
   an execution of a particular DELAY instruction by the processor delays execution by the processor for a specified number of cycles to delay;
   the execution of the particular DELAY instruction by the processor requires a single instruction decode; and
   a number of cycles delayed by any execution of a DELAY instruction by the processor is guaranteed to form a linear function with a constant slope based on the specified number of cycles to delay specified for execution of that DELAY instruction.

2. The processor in claim 1 wherein:
   the specified number of cycles to delay is specified in a fixed repeat count register.

3. The processor in claim 1 wherein:
   the DELAY instruction comprises:
      an instruction OP code, and
      a set of at least one operands for specifying the specified number of cycles to delay.

4. The processor in claim 3 wherein:
   the set of at least one operands designates a first register and a second register that when added together determine the specified number of cycles to delay.

5. The processor in claim 3 wherein:
   the set of at least one operands designates a register and a constant integer that when added together determine the specified number of cycles to delay.

6. The processor in claim 3 wherein:
   the set of at least one operands designates a memory location containing the specified number of cycles to delay.

7. The processor in claim 3 wherein:
   the set of at least one operands designates a single register containing the specified number of cycles to delay.

8. The processor in claim 7 wherein:
   whenever the processor is interrupted during execution of the DELAY instruction, the single register contains a remaining number of cycles to delay.

9. The processor in claim 1 which comprises:
   a register containing a remaining cycle delay count during execution of a DELAY instruction; and
   a circuit that decrements the register once per cycle during execution of the DELAY instruction in order to determine when the specified number of cycles to delay has been reached.

10. The processor in claim 1 which comprises:
    an instruction decode circuit for recognizing and decoding the DELAY instruction; and
    a microcode engine for controlling execution of the DELAY instruction.

11. A data processing system comprising:
    a plurality of processors, each capable of executing a DELAY instruction, wherein:
       an execution of a particular DELAY instruction by any one of the plurality of processors delays that one of the plurality of the processors by a specified number of cycles to delay;
       the execution of the particular DELAY instruction by the one of the plurality of processors requires a single instruction decode; and
       a number of cycles delayed by any execution of a DELAY instruction by any of the plurality of processors is guaranteed to form a linear function with a constant slope based on the specified number of cycles to delay specified for execution of that DELAY instruction.

12. The data processing system in claim 11 wherein:
    each of the processors has a repeat count register; and
    the specified number of cycles to delay is specified in the repeat count register in each of the plurality of processors.

13. The data processing system in claim 11 wherein:
    the DELAY instruction comprises:
       an instruction OP code, and
       a set of at least one operands for specifying the specified number of cycles to delay.

14. The data processing system in claim 13 wherein:
    the set of at least one operands designates a first register and a second register that when added together determine the specified number of cycles to delay.

15. The data processing system in claim 13 wherein:
    the set of at least one operands designates a register and a constant integer that when added together determine the specified number of cycles to delay.

16. The data processing system in claim 13 wherein:
    the set of at least one operands designates a memory location containing the specified number of cycles to delay.

17. The data processing system in claim 13 wherein:
    the set of at least one operands designates a single register containing the specified number of cycles to delay.

18. The data processing system in claim 17 wherein:

whenever a one of the plurality of processors is interrupted during execution of the DELAY instruction, the single register is left containing a remaining cycle delay count.

19. The data processing system in claim 11 wherein:

each of the plurality of processors comprises:
- a register containing a remaining cycle delay count during execution of a DELAY instruction; and
- a circuit that decrements the register once per cycle during execution of the DELAY instruction in order to determine when the specified number of cycles to delay has been reached.

20. The data processing system in claim 11 which further comprises:
- a common clock generation circuit coupled to and providing a system clock signal to each of the plurality of processors.

21. A data processing system comprising:

a bus;

a plurality of processors coupled to the bus, each capable of executing a DELAY instruction, wherein:
- an execution of a particular DELAY instruction by any one of the plurality of processors delays that one of the plurality of the processors by a specified number of cycles to delay,
- a number of cycles delayed by any execution of a DELAY instruction by any of the plurality of processors is guaranteed to form a linear function with a constant slope based on the specified number of cycles to delay specified for execution of that DELAY instruction,
- the DELAY instruction comprises:
  - an instruction OP code, and
  - a set of at least one operands for specifying the specified number of cycles to delay,
- each of the plurality of processors comprises:
  - an instruction decode circuit for recognizing and decoding the DELAY instruction,
  - a register containing a remaining cycle delay count during execution of a DELAY instruction, and
  - a circuit for decrementing the register once per cycle during execution of the DELAY instruction in order to determine when the specified number of cycles to delay has been reached; and a common clock generation circuit coupled to the bus and providing a system clock signal to each of the plurality of processors.

22. The data processing system in claim 21 which comprises:

a first multiprocessor module coupled to the bus comprising:
- a local bus;
- at least two of the plurality of processors coupled to the local bus; and
- a shared cache memory coupled to the local bus.

23. The data processing system in claim 22 which further comprises:

a second multiprocessor module coupled to the bus comprising:
- a local bus;
- at least two of the plurality of processors coupled to the local bus; and
- a shared cache memory coupled to the local bus.

24. The data processing system in claim 22 wherein:

the first multiprocessor module comprises at least four of the plurality of processors coupled to the local bus.

* * * * *